US009811154B2

(12) United States Patent
Raffle et al.

(10) Patent No.: US 9,811,154 B2
(45) Date of Patent: **\*Nov. 7, 2017**

(54) METHODS TO PAN, ZOOM, CROP, AND PROPORTIONALLY MOVE ON A HEAD MOUNTABLE DISPLAY

(71) Applicant: Google Inc., Mountain View, CA (US)

(72) Inventors: Hayes Solos Raffle, Palo Alto, CA (US); Nirmal Patel, Mountain View, CA (US); Max Benjamin Braun, San Francisco, CA (US)

(73) Assignee: Google Inc., Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/968,316

(22) Filed: Dec. 14, 2015

(65) Prior Publication Data

US 2016/0103483 A1 Apr. 14, 2016

Related U.S. Application Data

(63) Continuation of application No. 13/851,923, filed on Mar. 27, 2013, now Pat. No. 9,213,403.

(51) Int. Cl.
*G06F 3/01* (2006.01)
*G02B 27/01* (2006.01)
(Continued)

(52) U.S. Cl.
CPC ......... *G06F 3/012* (2013.01); *G02B 27/0093* (2013.01); *G02B 27/01* (2013.01);
(Continued)

(58) Field of Classification Search
CPC ......... G06F 3/012; G06F 3/011; G06F 3/017; G06F 3/0346; G06F 3/03547;
(Continued)

(56) References Cited

U.S. PATENT DOCUMENTS 5,579,026 A 11/1996 Tabata
5,682,144 A 10/1997 Mannik
(Continued)

FOREIGN PATENT DOCUMENTS

DE 10100017 A1 5/2002
EP 0903661 A1 3/1999
(Continued)

OTHER PUBLICATIONS

Westeyn, Tracy, et al., Biometric Identification Using Song-Based Blink Patterns, Georgia Institute of Technology, available at http://citeseerx.ist.psu.edu/viewdoc/download?doi=10.1.1.85.4472&rep=rep1&type=pdf (last visited on Sep. 15, 2011).
(Continued)

*Primary Examiner* — Tom Sheng
(74) *Attorney, Agent, or Firm* — McDonnell Boehnen Hulbert & Berghoff LLP

(57) ABSTRACT

Methods, apparatus, and computer-readable media are described herein related to displaying and cropping viewable objects. A viewable object can be displayed on a display of a head-mountable device (HMD) configured with a hand-movement input device. The HMD can receive both head-movement data corresponding to head movements and hand-movement data from the hand-movement input device. The viewable object can be panned on the display based on the head-movement data. The viewable object can be zoomed on the display based on the hand-movement data. The HMD can receive an indication that navigation of the viewable object is complete. The HMD can determine whether a cropping mode is activated. After determining that the cropping mode is activated, the HMD can generate a cropped image of the viewable object on the display when navigation is complete.

20 Claims, 16 Drawing Sheets

(51) Int. Cl.

| | |
|---|---|
| G02B 27/00 | (2006.01) |
| G06F 3/0354 | (2013.01) |
| G06F 3/0481 | (2013.01) |
| G06F 3/0485 | (2013.01) |
| G06F 3/0346 | (2013.01) |

(52) U.S. Cl.
CPC .......... *G02B 27/0172* (2013.01); *G06F 3/011* (2013.01); *G06F 3/017* (2013.01); *G06F 3/0346* (2013.01); *G06F 3/03547* (2013.01); *G06F 3/0485* (2013.01); *G06F 3/04817* (2013.01); *G02B 2027/014* (2013.01)

(58) Field of Classification Search
CPC .... G06F 3/04817; G06F 3/0485; G06F 3/013; G06F 3/005; G02B 27/0093; G02B 27/01; G02B 27/0172; G02B 27/017; G02B 2027/014; G02B 2027/0178; G02B 2027/0138
See application file for complete search history.

(56) References Cited

U.S. PATENT DOCUMENTS

| | | | |
|---|---|---|---|
| 5,689,619 A | 11/1997 | Smyth | |
| 5,742,264 A | 4/1998 | Inagaki et al. | |
| 5,844,547 A | 12/1998 | Minakuchi et al. | |
| 5,959,597 A | 9/1999 | Yamada et al. | |
| 6,069,594 A * | 5/2000 | Barnes | G01S 5/186 345/156 |
| 6,184,847 B1 | 2/2001 | Fateh et al. | |
| 6,396,497 B1 | 5/2002 | Reichlen | |
| 7,088,343 B2 | 8/2006 | Smith et al. | |
| 7,176,888 B2 | 2/2007 | Marvit et al. | |
| 7,346,195 B2 | 3/2008 | Lauper et al. | |
| 7,440,592 B1 | 10/2008 | Nimmer | |
| 7,479,949 B2 | 1/2009 | Jobs et al. | |
| 7,876,374 B2 | 1/2011 | Sako et al. | |
| 8,316,319 B1 | 11/2012 | Patel et al. | |
| 8,452,978 B2 | 5/2013 | Alward et al. | |
| 9,213,403 B1 * | 12/2015 | Raffle | G06F 3/011 |
| 9,279,983 B1 * | 3/2016 | Davis | G02B 27/01 |
| 9,448,687 B1 * | 9/2016 | McKenzie | G06F 3/0481 |
| 2001/0043402 A1 | 11/2001 | Melville | |
| 2003/0142041 A1 | 7/2003 | Barlow et al. | |
| 2004/0030753 A1 | 2/2004 | Horvitz | |
| 2006/0115130 A1 | 6/2006 | Kozlay | |
| 2006/0253793 A1 | 11/2006 | Zhai et al. | |
| 2007/0188407 A1 | 8/2007 | Nishi | |
| 2008/0122796 A1 | 5/2008 | Jobs et al. | |
| 2009/0058660 A1 | 3/2009 | Torch | |
| 2009/0165144 A1 | 6/2009 | Fujita | |
| 2009/0303176 A1 | 12/2009 | Chen et al. | |
| 2009/0315740 A1 | 12/2009 | Hildreth et al. | |
| 2010/0110368 A1 | 5/2010 | Chaum | |
| 2010/0161084 A1 * | 6/2010 | Zhao | G01C 17/02 700/85 |
| 2010/0328351 A1 | 12/2010 | Tan | |
| 2011/0001699 A1 * | 1/2011 | Jacobsen | G06F 3/012 345/157 |
| 2011/0012848 A1 | 1/2011 | Li et al. | |
| 2011/0187640 A1 * | 8/2011 | Jacobsen | G02B 27/017 345/156 |
| 2012/0016641 A1 | 1/2012 | Raffa et al. | |
| 2012/0050044 A1 | 3/2012 | Border et al. | |
| 2012/0050140 A1 | 3/2012 | Border et al. | |
| 2012/0050142 A1 | 3/2012 | Border et al. | |
| 2012/0050143 A1 | 3/2012 | Border et al. | |
| 2012/0188148 A1 | 7/2012 | DeJong | |
| 2012/0218177 A1 | 8/2012 | Pang et al. | |
| 2012/0313848 A1 | 12/2012 | Galor et al. | |
| 2013/0069985 A1 | 3/2013 | Wong et al. | |
| 2013/0249861 A1 | 9/2013 | Chang et al. | |
| 2013/0293490 A1 | 11/2013 | Ward et al. | |
| 2013/0342569 A1 | 12/2013 | Karkkainen et al. | |
| 2014/0063055 A1 * | 3/2014 | Osterhout | G06F 3/005 345/633 |
| 2014/0063062 A1 | 3/2014 | Fateh | |
| 2014/0266988 A1 * | 9/2014 | Fisher | G02B 27/017 345/8 |
| 2014/0361988 A1 | 12/2014 | Katz et al. | |

FOREIGN PATENT DOCUMENTS

| | | |
|---|---|---|
| EP | 2202609 A2 | 6/2010 |
| EP | 2156652 B1 | 4/2012 |
| JP | 2001154794 | 6/2001 |
| WO | 2004084054 A2 | 9/2004 |
| WO | 2013/002990 A2 | 1/2013 |
| WO | 2013/012554 A2 | 1/2013 |
| WO | 2013003414 A2 | 1/2013 |
| WO | 2013006518 A2 | 1/2013 |

OTHER PUBLICATIONS

Westeyn, Tracy, et al, Recognizing Song-Based Blink Patterns: Applications for Restricted and Universal Access, Georgia Institute of Technology, available at http://www-static.cc.gatech.edu/fac/Thad.Stamer/p/031_30_Gesture/westeyn_FG2004.pdf (last visited on Sep. 15, 2011).

Lin, Chern-Sheng, et al., A Novel Device for Head Gesture Measurement System in Combination with Eye-controlled Human-Machine Interface, Optics and Lasers in Engineering, Jun. 2006, pp. 597-614, vol. 44, Issue 6.

Lin, Chern-Sheng, et al., A New Image Processing Method for Evaluating the Pupillary Responses in a HMD Type Eye-Tracking Device, Optics and Lasers Technology, 2003, vol. 35, pp. 505-515.

Yeh, Chin-Yen, Image-Based Human Computer Interfaces for People with Severe Disabilities, available at: http://thesis.lib.ncu.edu.tw/ETD-db/ETD-search/view_etd?URN=955202006#anchor (last visited Sep. 15, 2011).

Arai, Kohei, et al., Real Time Blinking Detection Based on Gabor Filter, International Journal of Human Computer Interaction, vol. 1, Issue 3, pp. 33-40, available at http://www.cscjournals.org/csc/manuscript/Journals/IJIP/Finalversion/Camera_ready_IJHCI-11.pdf (last visited on Sep. 15, 2011).

Grauman, K., et al., Communication Via Eye Blinks and Eyebrow Raises: Video-Based Human-Computer Interfaces, Univ Access Int Soc (2003), vol. 2, pp. 359-373.

Ishiguro, Yoshio, et al., Aided Eyes: Eye Activity Sensing for Daily Life, Proceedings of the 1st Augmented Human International Conference, 2010, available at http://portal.acm.org/citation.cfm?id=1785480 (last visited Sep. 15, 2011).

Fairclough, Stephen H., Physiological Computing: Interfacing with the Human Nervous System, available at http://web.mac.com/shfairclough/Stephen_Fairclough_Research/Publications_physiological_computing_mental_effort_stephen_fairclough_files/probing_experience_sf.pdf (last visited Sep. 16, 2011).

Mulgund, Sandeep S., et al., A Situation-Driven Adaptive Pilot/Vehicle Interface, available at http://citeseerx.ist.psu.edu/viewdoc/download?doi=10.1.1.40.2831&rep=rep1&type=pdf(last visited Sep. 16, 2011).

Cho, Hyun Sang, Development of Brain Computer Interface for VR-based Ubiquitous Environment Control System, available at http://web.kaist.ac.kr/~haemosu/papers/7.pdf (last visited Sep. 16, 2011).

Caldwell, Tracey, Syntec Optics and Eye-Com Combine Eye Tracking with Head Movement Technology, Biometric Technology Today, Mar. 2011, pp. 2.

NeuroSky Developer Tools 2.1 Supports Eye Blink Detection, pp. 1-100, available at http://gadgetfanboy.com/general/neurosky-developer-tools-21-supports-eye-blink-detection/ (last visited Jul. 8, 2011).

NeuroSky Developer Tools 2.1 Supports Eye Blink Detection, pp. 101-284, available at http://gadgetfanboy.com/general/neurosky-

(56) References Cited

OTHER PUBLICATIONS developer-tools-21-supports-eye-blink-detection/ (last visited Jul. 8, 2011).

\* cited by examiner

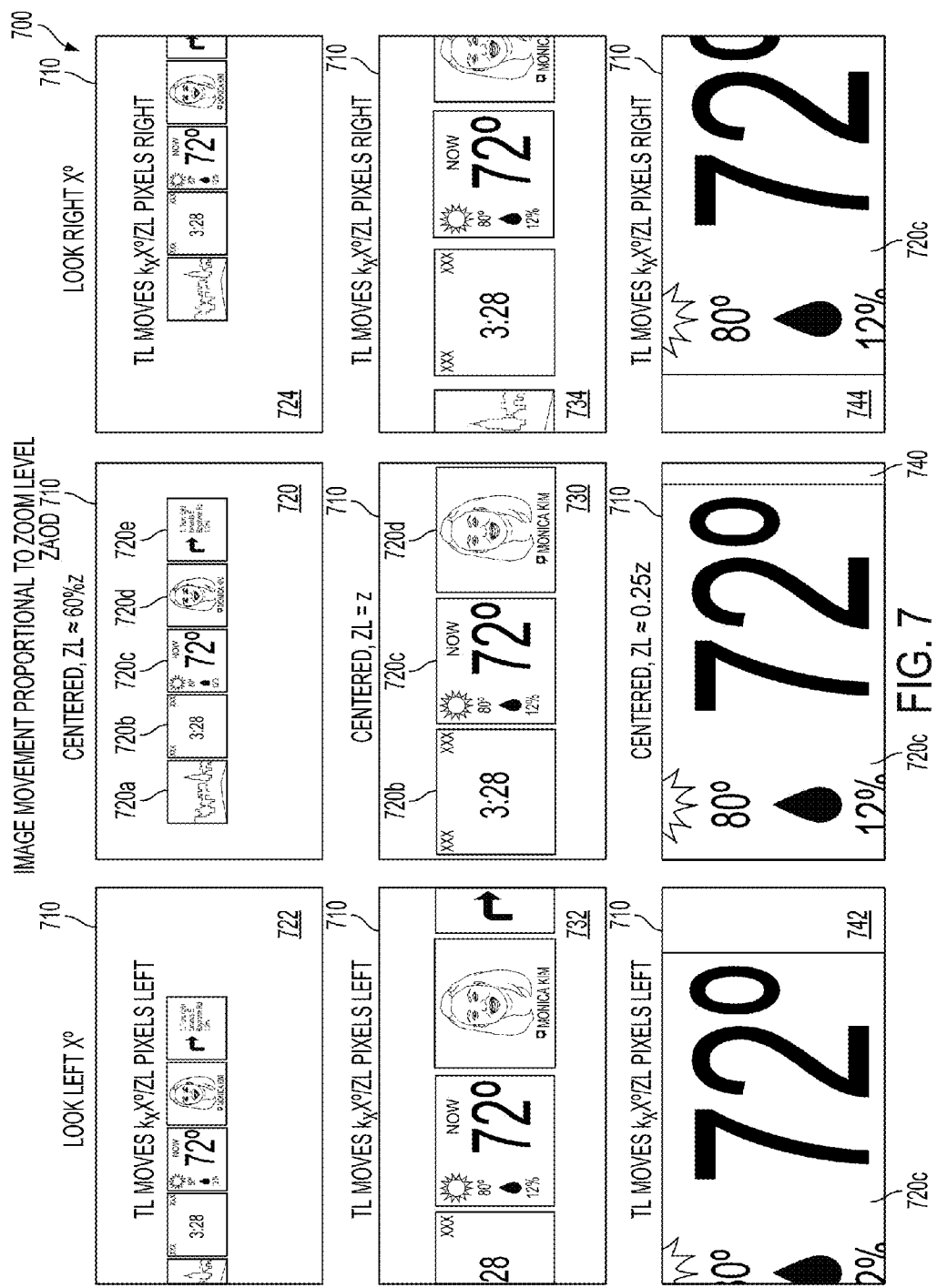

METHODS TO PAN, ZOOM, CROP, AND PROPORTIONALLY MOVE ON A HEAD MOUNTABLE DISPLAY

CROSS-REFERENCE TO RELATED APPLICATION

This application is a continuation of U.S. patent application Ser. No. 13/851,923, filed on Mar. 27, 2013, which is incorporated herein by reference in its entirety and for all purposes.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, a method is provided. A head-mountable device (HMD) configured with a hand-movement input device displays at least one viewable object on a display provided by the HMD. The HMD is configured to receive head-movement data corresponding to head movements and to receive hand-movement data corresponding to inputs from the hand-movement input device. The HMD receives head-movement data. The at least one viewable object is panned on the display based on the head-movement data. The HMD receives hand-movement data. The at least one viewable object is zoomed on the display based on the hand-movement data. The HMD receives an indication that navigation of the at least one viewable object is complete. The HMD determines whether a cropping mode is activated. After determining that the cropping mode is activated, the HMD can generate a cropped image of the at least one viewable object on the display when navigation of the at least one viewable object is complete. The HMD may perform an operation on a cropped image.

In yet another aspect, an apparatus is provided. The apparatus includes a non-transitory computer-readable storage medium having stored thereon program instructions. The program instructions, upon execution by a computing device, cause the apparatus to perform functions including: displaying at least one viewable object on a display, where the apparatus is configured to receive head-movement data corresponding to head movements and to receive hand-movement data corresponding to inputs from the hand-movement input device; receiving head-movement data; panning the at least one viewable object on the display based on the head-movement data; receiving hand-movement data; zooming the at least one viewable object on the display based on the hand-movement data; determining whether a cropping mode is activated; and after determining that the cropping mode is activated: generating a cropped image of the at least one viewable object on the display when navigation of the at least one viewable object is complete and performing an operation on the cropped image.

In another aspect, a computing device is provided. The computing device includes a hand-movement input device, a display, a processor, and a non-transitory computer-readable storage medium having stored thereon program instructions. The program instructions, upon execution by the processor, cause the computing device to perform functions including: displaying at least one viewable object on the display, where the computing device is configured to receive head-movement data corresponding to head movements and to receive hand-movement data corresponding to inputs from the hand-movement input device; receiving head-movement data; panning the at least one viewable object on the display based on the head-movement data; receiving hand-movement data; zooming the at least one viewable object on the display based on the hand-movement data; receiving an indication that navigation of the at least one viewable object is complete; determining whether a cropping mode is activated; after determining that the cropping mode is activated, generating a cropped image of the at least one viewable object on the display when navigation of the at least one viewable object is complete. The functions may also include performing an operation on the cropped image.

In yet another aspect, an apparatus is provided. The apparatus includes: means for displaying at least one viewable object; means for receiving head-movement data corresponding to head movements; means for receiving hand-movement data corresponding to hand movements; means for panning the at least one viewable object on the display based on the head-movement data; means for zooming the at least one viewable object on the display based on the hand-movement data; means for receiving an indication that navigation of the at least one viewable object is complete; means for determining whether a cropping mode is activated; and means for, after determining that the cropping mode is activated, generating a cropped image of the at least one viewable object on the display when navigation of the at least one viewable object is complete. The apparatus may also include means for performing an operation on the cropped image.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 shows images from an HMD utilizing a ZAOD for Z-dimensional proportional navigation, according to an example embodiment.

DETAILED DESCRIPTION

Overview

Figure 1A:
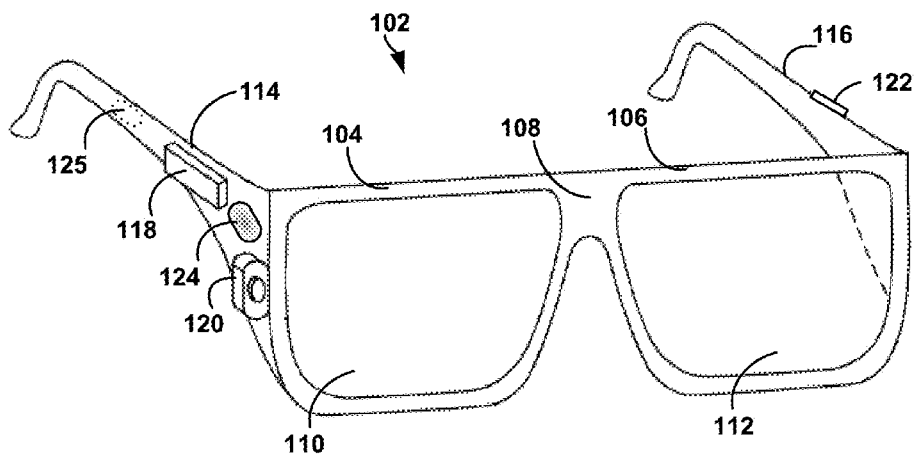
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Many example graphical user interfaces (GUIs) provide information and/or allow for user interaction in two dimensions. The two dimensions can be identified as the X dimension and the Y dimension, where the X dimension is for horizontal or left-right movement, and Y dimension is for vertical or up-down movement.

For example, a GUI for an HMD or other computing device may include a two-dimensional timeline feature that allows the wearer to navigate through a sequence of ordered screens arranged along an X-axis representing time. In the context of such a timeline feature, each screen may be referred to as a "card." Among the sequence of cards, one or more cards can be displayed, and of the displayed card(s), one card can be "focused on" for possible selection. For example, the timeline can be present one card for display at a time, and the card being displayed is also the card being focused on. In one embodiment, when a card is selected, the card can be displayed using a single-card view that occupies substantially all of the viewing area of the display.

Each card may be associated with a certain application, object, or operation. The cards can be ordered by a time associated with the card, application, object or operation represented by the card. For example, if a card shows a photo captured by a wearer of the HMD at 2:57 PM, the time associated with the card is the time associate with the underlying photo object of 2:57 PM. Upon power up, the HMD can display a "home card", also referred to as a home screen. The home card can display a clock, and be associated with a time of "now" or a current time. In some cases, the home card can display a clock, to reinforce the association between the home card and now. Then, cards associated with times before now can be viewed in the timeline as prior to the home card, and cards associated with times equal to or after now can be viewed in the timeline subsequent to the home card.

In some embodiments, the GUI can be configured to generate and display a Z-axis oriented display (ZAOD). The ZAOD can enable navigation along X, Y, and Z dimensions of a volume defined by X, Y, and Z axes, where navigation along the X dimension can specify a value of an X-axis coordinate within the volume, where navigation along the Y dimension can specify a value of a Y-axis coordinate within the volume, and where navigation along the Z dimension can specify value of a Z-axis coordinate within the volume. For example, let a volume V have X-axis coordinates ranging from $[X_{min}, X_{max}]$, Y-axis coordinates ranging from $[Y_{min}, Y_{max}]$, and Z-axis coordinates ranging from $[Z_{min}, Z_{max}]$, where $X_{max} > X_{min}$, $Y_{max} > Y_{min}$, and $Z_{max} > Z_{min}$. Then, navigation along X, Y, and Z dimensions of volume V can include specifying a point (X, Y, Z) within V, where X is in the range $[X_{min}, X_{max}]$, Y is in the range $[Y_{min}, Y_{max}]$, and Z is in the range $[Z_{min}, Z_{max}]$.

In some embodiments, navigation within the volume can include displaying and/or refreshing/updating a display as points within the volume are specified; e.g., let P=(X, Y, Z) within the volume V be a currently specified point, and let P2=(X2, Y2, Z2) be a navigated-to (i.e., newly specified) point. Then, let $\Delta$=(X2−X, Y2−Y, Z2−Z) specify a movement indicated by navigation from P to P2. Upon navigating from P to P2, the GUI can update a display of the ZAOD to indicate that P2 is the navigated-to point and that P is no longer the navigated-to point and/or refresh the display of the ZAOD to indicate movement $\Delta$ from P to P2. Indicating the movement $\Delta$ from P to P2 can include moving (panning)

left, right, up, and/or down along an XY plane defined by the X and Y axes to indicate movement along the XY plane, and/or moving (zooming) in or out along the Z axis to indicate movement along the Z axis.

Use of ZAODs can make GUIs more intuitive and easier to use. For example, a UI action associated with "moving toward" a wearer of an HMD can be associated with "increasing" a parameter/value or "bringing closer"/"answering" a message. Similarly, a UI action associated with "move away" a wearer of an HMD can be associated with "decreasing" a parameter/value or "pushing away"/"rejecting" a message. To simulate Z axis operations, increasing the size of an object in an XY display can simulate bringing the object closer, while decreasing the size of an object in the XY display can simulate moving away from the object.

Another use of the third dimension can also permit increasing or decreasing size of a two dimensional display from the perspective of a wearer of the HMD. For example, by default, the timeline can present one card for display at a time, and the card being displayed is also the card being focused on. In one embodiment, when a card is selected, the card can be displayed, perhaps by default, using a single-card view that occupies substantially all of the viewing area of the display.

Using the third dimension with the timeline feature can permit zooming out, or decreasing the size of, and zooming in, or increasing the size of the timeline feature. As the wearer zooms in on one card, the one card can be thought to be brought closer to the wearer and occupy most or all of the wearer's display of the timeline. In some embodiments, the wearer can zoom in on a single card display obtain additional information about the single card being displayed. For example, if the single card shows a contact, zooming in on or bringing the contact card closer can show additional information, such as e-mail address, telephone number, job title, and physical address information for the contact. As another example, bringing a card of a photo or video closer can lead to displaying additional information, such as time, date, size, and perhaps location information associated with the photo or video. Zooming away from, or pushing the single card away can lead to clearing the display of the additional information, and, if pushed away far enough, lead to a multi-card display of the timeline feature.

Z-axis oriented displays can be used to edit objects, such as photos and videos. The UI actions for zooming in and zooming out of the object can be used for the zooming in/zooming out on the display of the object. X-axis and Y-axis movements can be performed using UI events that track head movements of the wearer. For example, "panning" or moving up in the display of the object can be directed by an upward head movement by the wearer. Similarly, panning down, left, and right within the display of the object can be performed by using suitable head movements. Further, by tilting the head of the wearer left or right, the display of the object can be correspondingly rotated. These techniques can be combined to navigate within the display of the object.

Once navigation is complete, the "cropped" object or object as displayed can be saved for future use, such as sharing with others, use with other applications; e.g., displayed on a web page using a browser or as a background image, and/or for other purposes. The cropped object can be specified using a "cropping window" of the original object. For example, let the original object be an image I having R rows and C columns of pixels. Using one-based addressing into the image, I can be bounded by a rectangle from pixel (1, 1) in the upper-left-hand corner to pixel (R, C). The cropping window of image I can be a rectangle of pixels ($row_{min}$, $col_{min}$) to ($row_{max}$, $col_{max}$), where $1 \leq row_{min}$, $row_{max} \leq R$, $1 \leq col_{min}$, $col_{max} \leq C$, $row_{min} \leq row_{max}$, and $col_{min} \leq col_{max}$.

The cropping window can be applied to a sequence of images, such as a video. For example, suppose a subject of interest is within the cropping window during an entirety of a video. The cropping window can be specified for one image of the video and applied to all images of the video to generate an edited video object. Cropping windows can also be applied to image-related objects, such as a map, to enable selection of an area of the image-related object for display and navigation.

Movement within a ZAOD of an HMD can be made in proportion to the Z-axis component. For example, an X-axis movement of X° can act as an instruction to the ZAOD to move a display by a number of pixels $NP_x$ along the X-axis based on the X-axis movement such that $NP_x$ is proportional to the Z axis component. For example, $NP_x$ can be calculated as $NP_x = k_x X° Z$, where $k_x$ is a constant of proportionality for the X-axis, X° indicates an X-axis movement in degrees, and Z is a current Z-axis component for ZAOD, where Z is the current Z-axis component used by the ZAOD. Similarly, a Y-axis movement of Y° can act as an instruction to the ZAOD to move a display by a number of pixels $NP_y$ along the Y-axis based on the Y-axis movement such that $NP_y$ is proportional to Z. For example, $NP_y$ can be calculated as $NP_y = k_y Y° Z$, where $k_y$ is a constant of proportionality for the Y-axis and Y° indicates a Y-axis movement in degrees.

Movement within a ZAOD of an HMD in proportion to the Z-axis component can make use of the ZAOD more intuitive. When looking at a nearby object, such while reading a book, a small head movement left, right, up, or down leads to a relatively small movement in absolute terms (e.g., inches, centimeters) within the book in comparison to the same head movement performed while looking at far-away object(s), such as stars in a clear night sky. Similarly, when wearing an HMD, the wearer can intuit that movements on zoomed-in HMD displays should lead to smaller movements in absolute terms (e.g., numbers of pixels) changing than for zoomed-out HMD displays.

ZAODs can allow for different imagery and/or additional information to be displayed and controlled using natural combinations of finger and head movements. The techniques described herein can, in part, enable Z-axis oriented displays to provide an intuitive interface for editing objects and for navigating displays.

Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In some embodiments, hand or finger based inputs that can be received via touchpad 124 can be received using one or more hand-movement input devices configured to detect hand movements and/or finger movements and provide corresponding hand-movement data, such as but not limited to, buttons, touch screens, computer mice, gesture sensors, free space/3D gesture sensors, virtual reality gloves, other types of gloves, cameras, optical gesture sensors, noncontact electrostatic gesture sensors, a magnetometer detecting a moving magnetic field controlled by a wearer; e.g., a ring having a magnetic field being worn and moved by the wearer, and infrared sensors/sensor arrays.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further, it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
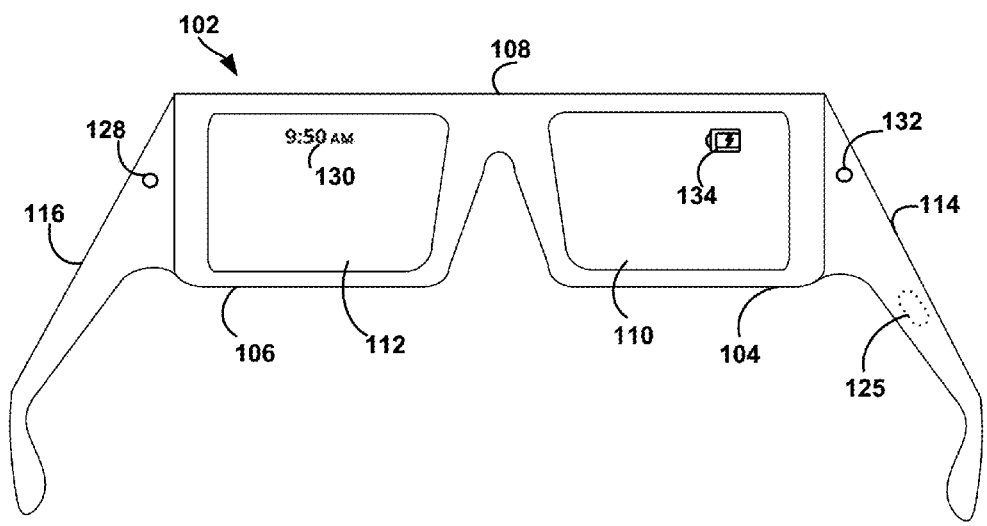
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
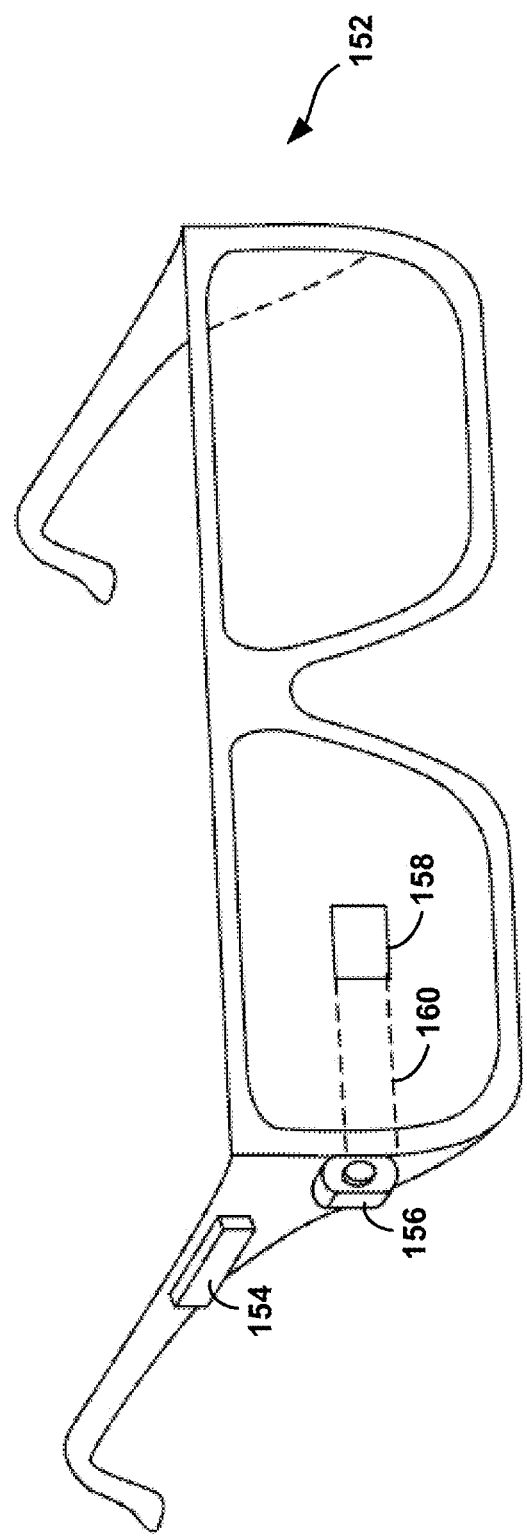
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158, which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
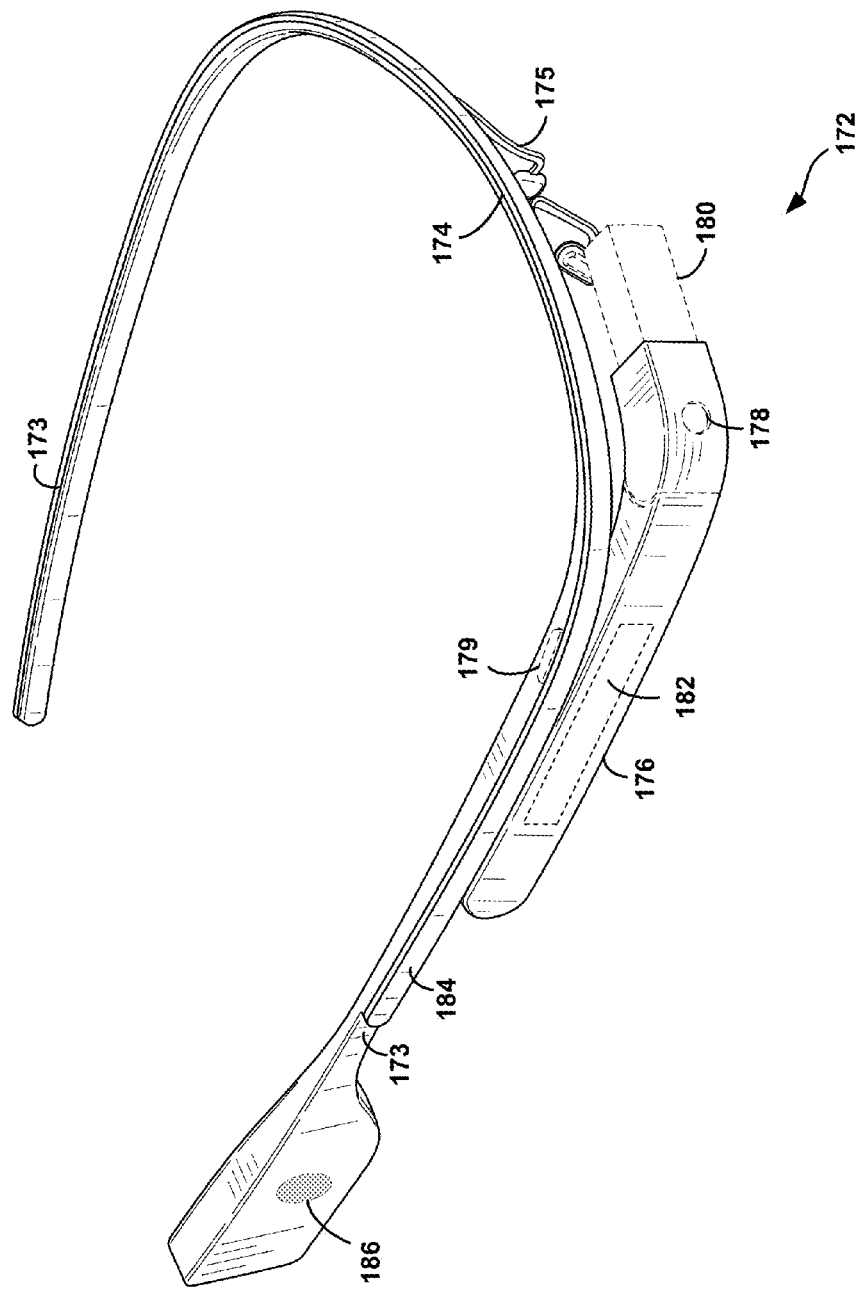
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
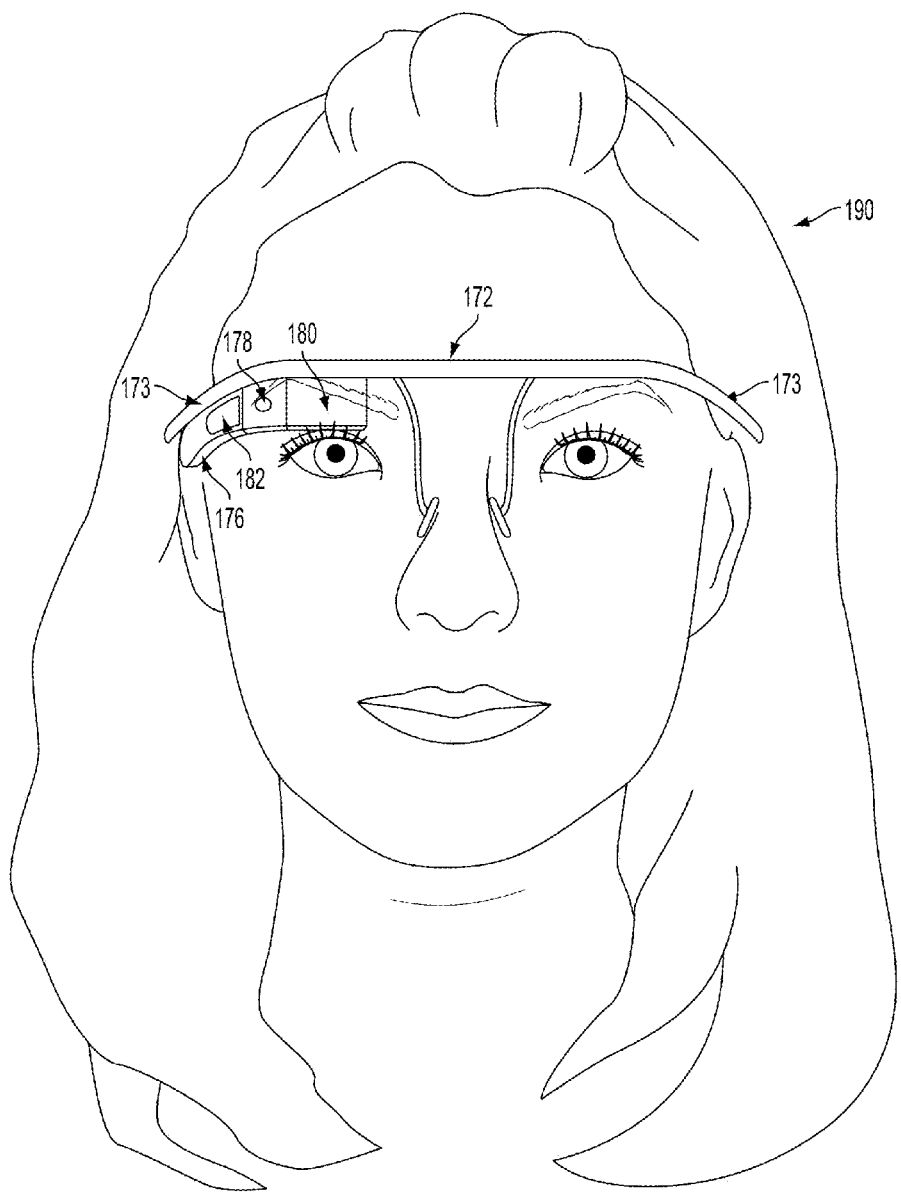
FIGS. 1E to 1G are simplified illustrations of the wearable computing system shown in FIG. 1D, being worn by a wearer.
Figure 1F:
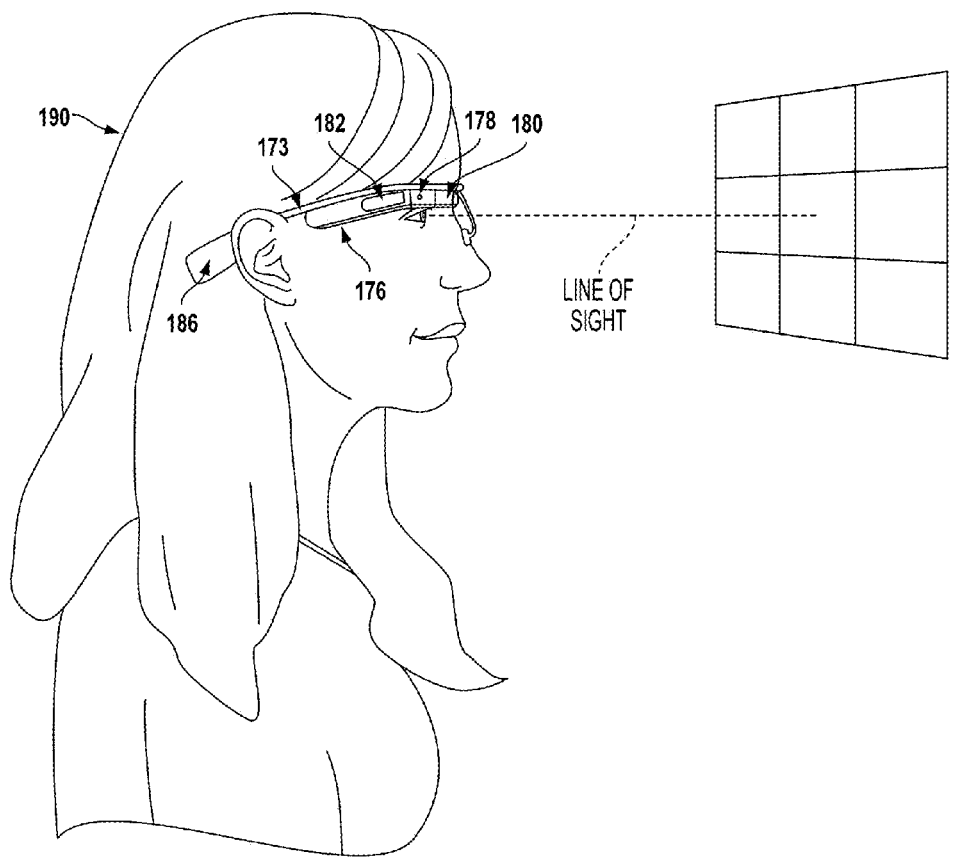
Figure 1G:
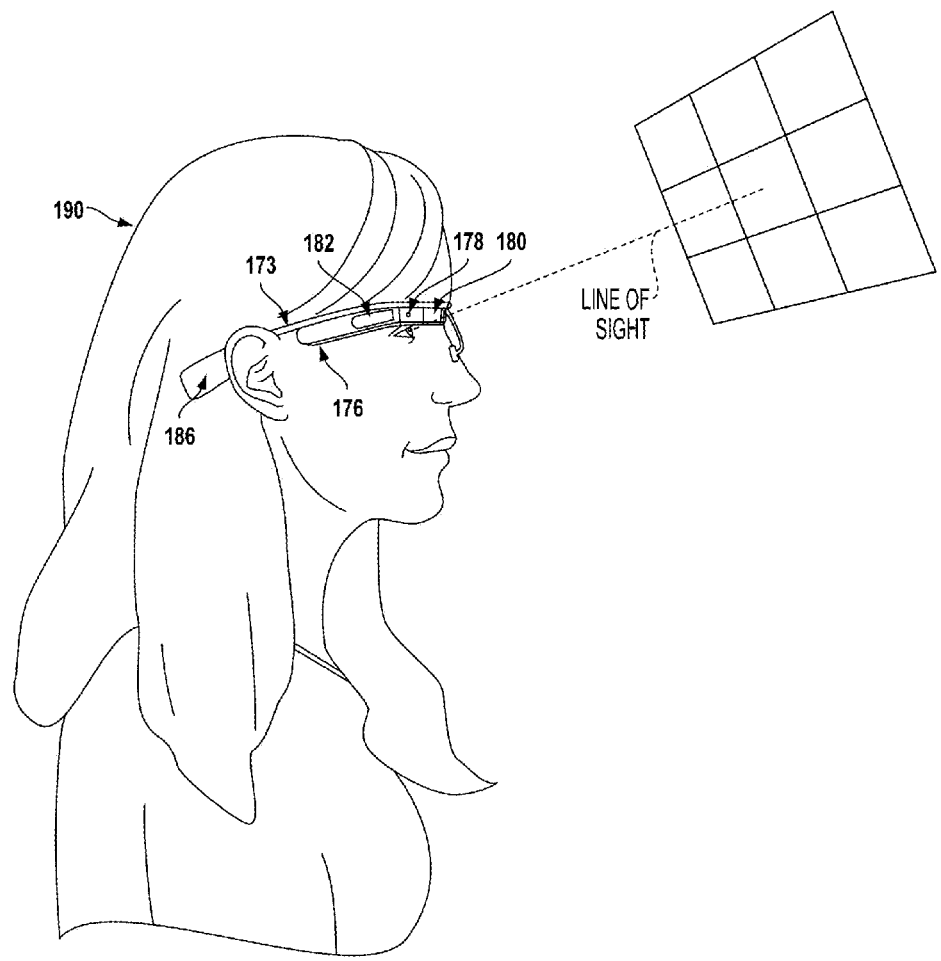

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G where the wearer has moved their eyes to look up and align their line of sight with display 180. A wearer might also use the display by tilting their head down and aligning their eye with the display 180.

Figure 2A:
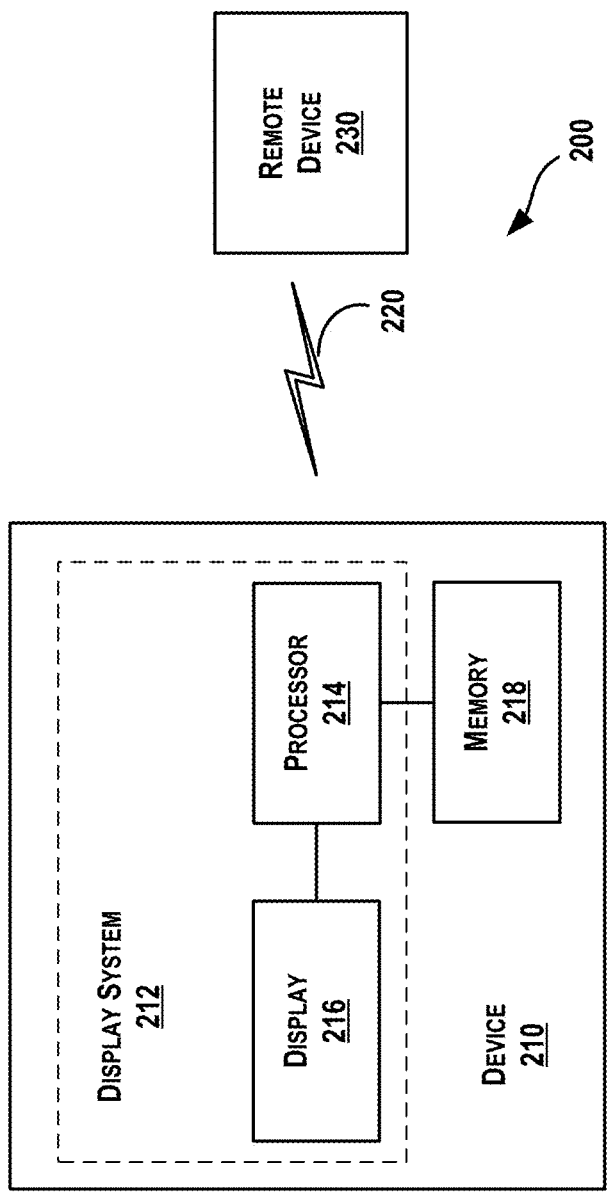
FIG. 2A illustrates a schematic drawing of a computing device according to an example embodiment.

FIG. 2A illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

Example Coordinate Systems

Figure 2B:
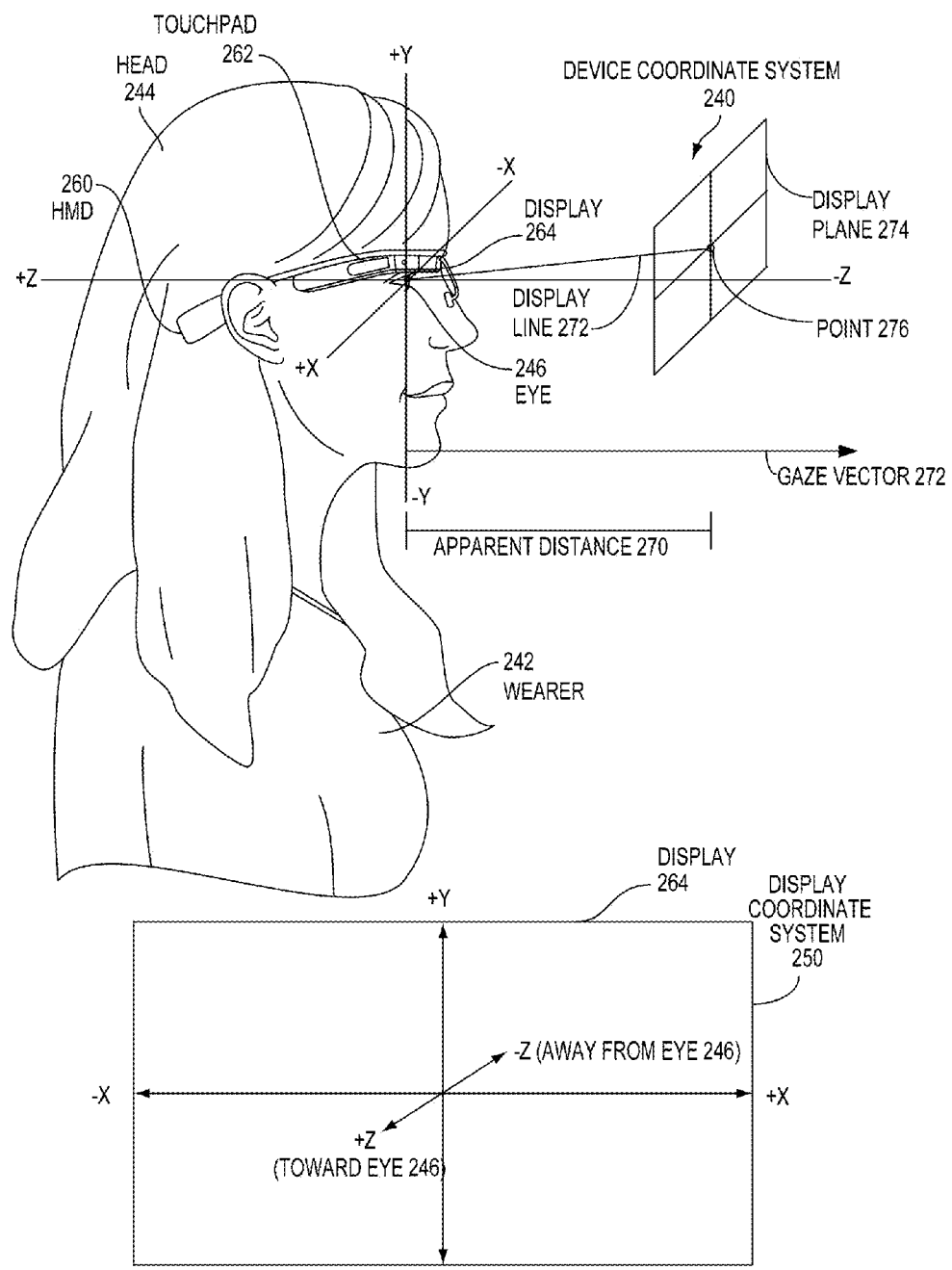
FIG. 2B shows an example device coordinate system and an example display coordinate system according to an example embodiment.

FIG. 2B shows an example device coordinate system 240 and corresponding display coordinate system 250 in accordance with an embodiment. The device coordinate system 250 is used herein: when WCD 260 is level and upright on head 244 of wearer 242 with display 264 facing eye 246 of wearer 242, as shown in FIG. 2B, +X is right, +Y is up, and +Z is towards eye 246 (with respect to display 264) such that forward is −Z. In Figures showing the YZ plane, +X is toward the reader and −X is away from the reader in device coordinates. In terms of device coordinates, a swipe toward (sometimes termed swipe backward or swipe left) can involve a swipe, or movement by one or more fingers touching the touchpad, in the +Z direction. In device coordinates, a swipe away (sometimes termed swipe forward or swipe right) can involve swiping in the −Z direction.

Device coordinate system 240 can be used to specify a coordinate system for images shown in eye 246 of wearer 242 using display 264. FIG. 2B shows display coordinate system 250 for displaying images using display 264 as viewed by wearer 242. As shown in FIG. 2B, when WCD 260 is level and upright on head 244 with display 264 facing eye 246, +X in device coordinate system 250 is right along display 264, +Y in device coordinate system 250 is up with respect to display 264, and +Z in display coordinate system 250 is towards eye 246. For example, for fixed X and Y components in display coordinate system 250 objects shown on display 264 with a Z component of Z1 can appear to be larger to wearer 242 than objects having a Z component of Z2, where Z1>Z2. That is, as Z coordinates increase in display coordinate system 260, image displayed in display 264 using display coordinate system 250 appear increasingly larger up to the limits of display 264. In some embodiments, a two-dimensional display system can use coordinates of display coordinate system with a fixed Z component; e.g., Z=0. Unless specifically stated otherwise, X, Y, and Z components are specified below using display coordinate system 250.

HMD 260 can project an image in display plane 274 for view by wearer 242 at some apparent distance 270 along display line 272. For example, apparent distance 262 can be 1 meter, four feet, infinity, or some other distance.

Display line 272 can be based on gaze vector 270. Gaze vector 270 tracks wearer 254's gaze, or direction of viewing. In FIG. 2B, wearer 242 is looking directly in the −Z direction, and thus gaze vector 270 is a vector along the −Z axis. For the sake of viewability, FIG. 2B shows gaze vector below eye 246.

In an example shown in FIG. 2D, display line 272 can be directed to be above and to the right of gaze vector 270. Then, an image can be projected at a display plane 274 that is perpendicular to display line 272 and including a point 276 where display line 272 is apparent distance 270 from wearer 272. The image can be displayed in display plane 274 projected above and to the right of gaze vector 272; e.g., the image can be displayed as centered at point 276. Then, wearer 242 can look at a person or object along gaze vector 272 without the displayed image obscuring their gaze. In one example, the display element of the HMD 260 is translucent when not active (i.e. when an image is not being displayed), and so the wearer 254 can perceive objects in the real world along the vector of display line 272.

FIG. 2B shows that touchpad 262 is parallel, or at least substantially parallel, to display line 272, and thus is perpendicular, or at least substantially parallel to display plane 274. As such, touchpad 262 is at least substantially perpendicular to an image displayed in display plane 274. In some scenarios, touchpad 262 can be perpendicular to display plane 274 and so be perpendicular to an image displayed by display 264 in display plane 274. In other scenarios, touchpad 262 can be substantially, but not exactly, perpendicular to display plane 274 depending on a shape of a face of wearer 242, an exact angle that wearer 242 wears HMD 260 at any specific time, a specific configuration of HMD 260, and for other reasons that would cause touchpad 262 to vary from being perpendicular to an image displayed by display 264 in display plane 274. In very particular embodiments, touchpad 262 is substantially perpendicular to an image displayed by display 264 if a line from touchpad 262 to a plane of the image, e.g., display plane 274 is within 10 degrees of being perpendicular to the plane of the image.

An Example User Interface for an HMD

FIGS. 3 through 7 collectively describe aspects of an example user interface for an HMD such as discussed above at least in the context of FIGS. 1A through 2B. The HMD can be configured with a UI controller receiving inputs from at least a touch-based UI. The touch-based UI can include one or more hand-movement input devices that are configured to receive various hand movements, such as one-finger swipes in various directions, two-finger or multi-finger swipes in various directions, taps, button presses of various durations, and button releases, and generate corresponding hand-movement data. In some embodiments, the one or more hand-movement input devices can be one or more of the hand-movement input devices discussed above in the context of FIG. 1A. In particular embodiments, the one or more hand-movement input devices can include a touchpad, such as touchpad 124, and a button. In some embodiments, the HMD can utilize a voice-based UI as well.

Once a touch is received, the touch-based UI can report the touch; e.g., a "swipe forward" or "tap" to the HMD, or in some cases, to a component of the HMD such as a UI controller. In other embodiments, the HMD can act as the UI controller. As described herein, the HMD includes any necessary components, such as but not limited to one or more UI controllers, which are configured to perform and control the UI operations described herein.

The HMD can generate cards that can occupy the full display of the HMD when selected. One card is a home card that is the first card displayed when UI is activated, for example shortly after HMD powers up or when the HMD wakes from a sleep or power-saving mode.

The UI can accept as inputs certain UI operations performed using the touch-based UI. The UI can receive these UI operations and responsively perform actions to enable the wearer to interact with the HMD.

These UI operations can be organized into tiers. A basic tier provides the smallest number of UI operations of any tier. An intermediate tier includes all UI operations provided by the basic tier, along with additional operations not provided by the basic tier. Similarly, an advanced tier includes all UI operations provided by the basic and intermediate tiers, along with additional operations not provided by either the basic tier or intermediate tier.

An example basic tier provides tap, swipe forward, swipe backward, voice, and camera button press operations. A tap operation can involve a single physical tap—that is, one quick, slight strike with one or more fingers on a touchpad of the touch-based UI. A swipe forward operation, sometimes termed a swipe away or a swipe right, can involve a swipe in the general −Z direction; e.g., the direction from the wearer's ear toward the wearer's eye when the wearer has the HMD on. A swipe backward operation, sometimes termed a swipe left or swipe toward, can involve in the general +Z direction; e.g., the direction from the wearer's eye toward the wearer's ear when the wearer has the HMD on. A swipe down operation can involve a downward swipe, where downward is the general direction from the top of the wearer's head toward the wearer's neck when the wearer has the HMD on; e.g., the −Y direction in device coordinate system 250.

While example embodiments in this description make reference to particular directions of touchpad input such as up, down, left, right, it should be understood that these are exemplary and that embodiments where certain operations may be triggered via different input directions are contemplated.

In one embodiment, the physical actions used by the wearer to perform some or all of the herein-described operations can be customized; e.g., by the wearer and/or other entity associated with the HMD. For example, suppose the wearer prefers to perform a physical action of a double-tap—that is, one physical tap quickly followed by a second physical tap—rather than the above-mentioned single physical tap, to perform a tap operation. In this embodiment, the wearer and/or other entity could configure the HMD to recognize a double-tap as a tap operation, such as by training or setting the HMD to associate the double-tap with the tap operation. As another example, suppose that the wearer would like to interchange the physical operations to perform swipe forward and backward operations; e.g., the swipe away operation would be performed using a physical action described above as a swipe left and the swipe toward operation would be performed using a physical action described above as a swipe right. In this embodiment, the wearer could configure the HMD to recognize a physical swipe left as a swipe away operation and physical swipe right as a swipe toward operation. Other customizations are possible as well; e.g., using a sequence of swipes to carry out the tap operation.

The tap operation can select a currently visible card. The swipe away operation can remove the currently visible card from display and select a next card for display. The swipe toward operation can remove the currently visible card from display and select a previous card for display. In other contexts, such as in the context of a Z-axis oriented display, a swipe toward and a swipe away can have different effects, such as, respectively zooming in or zooming out on an image or timeline, increasing or decreasing a settings value, or respectively causing a message to be answered or rejected.

The swipe down operation can, depending on context, act to go back, go home, or sleep. Going back can remove the currently visible card from display and display a previously-visible card for display. For example, the previously-visible card can be the card that was most recently prior currently visible card; e.g. if card A is currently visible and card B is the recently prior currently visible card, then the swipe down operation can remove card A from visibility and display card B. Going home can replace the currently visible card from display and display the home card. Sleeping can cause part; e.g., the display, or all of the HMD to be deactivated.

In some embodiments, a voice operation can provide access to a voice menu of operations. In other embodiments, a camera button press can instruct the HMD to take a photo using a camera associated with and/or part of the HMD.

The intermediate tier can provide tap, swipe forward, swipe backward, voice, and camera button press operations as described above in the context of the basic tier. Also, the intermediate tier can provide camera button long press, two finger swipe forward, two finger swipe backward, and two finger swipe down operations.

The camera button long press operation can instruct the HMD to provide a capture menu for display and use. The capture menu can provide one or more operations for using the camera associated with HMD.

In some embodiments, Z-axis oriented movement within an HMD display can be performed by a wearer using two fingers on the touchpad of the HMD to swipe forward/away and swipe backward/toward. For example, a two-finger swipe forward (swipe away) can be interpreted as moving away or decreasing a Z-axis coordinate, and a two-finger swipe backward (swipe toward) can be interpreted as moving toward or increasing the Z-axis coordinate. In some scenarios, a two-finger swipe backward can be used to zoom in on one or more cards and a two-finger swipe forward can be used to zoom out from one or more cards.

The two finger swipe down can cause the HMD to sleep. In some embodiments, the two finger swipe down can save the current position in the timeline for recall and redisplay upon awakening the HMD.

The advanced tier can provides tap, swipe forward, swipe backward, voice, and camera button press operations as described above in the context of the basic tier, as well as camera button long press, two finger swipe forward, two finger swipe backward, and two finger swipe down operations described above in the context of the intermediate tier. The advanced tier can also provide one-finger press-and-hold, two-finger press-and-hold, and nudge operations.

The two-finger press-and-hold can provide a "clutch" operation, which can be performed by pressing on the touch-based UI in two separate spots using two fingers and holding the fingers in their respective positions on the touch-based UI. After the fingers are held in position on the touch-based UI, the clutch operation is engaged. In some embodiments, the HMD recognizes the clutch operation only after the fingers are held for at least a threshold period of time; e.g., one second. The clutch operation will stay engaged as long as the two fingers remain on the touch based UI.

The nudge operation can be performed using a short, slight nod of the wearer's head. For example, the HMD can be configured with accelerometers or other motion detectors that can detect the nudge and provide an indication of the nudge to the HMD. Upon receiving indication of a nudge, the HMD can toggle an activation state of the HMD. That is, if the HMD is active (e.g., displaying a card on the activated display) before the nudge, the HMD can deactivate itself (e.g., turn off the display) in response. Alternatively, if the HMD is inactive before the nudge but is active enough to detect nudges; e.g., within two or a few seconds of notification of message arrival, the HMD can activate itself in response.

By way of further example, in one scenario, the HMD is powered on with the display inactive. In response to the HMD receiving a new text message, an audible chime can be emitted by the HMD. Then, if the wearer nudges within a few seconds of the chime, the HMD can activate and present a card or a Z-axis oriented display with the content of the text message. If, from the activated state, if the user nudges again, the display will deactivate. Thus, in this example, the user can interact with the device in a completely hands-free manner.

Figure 3A:
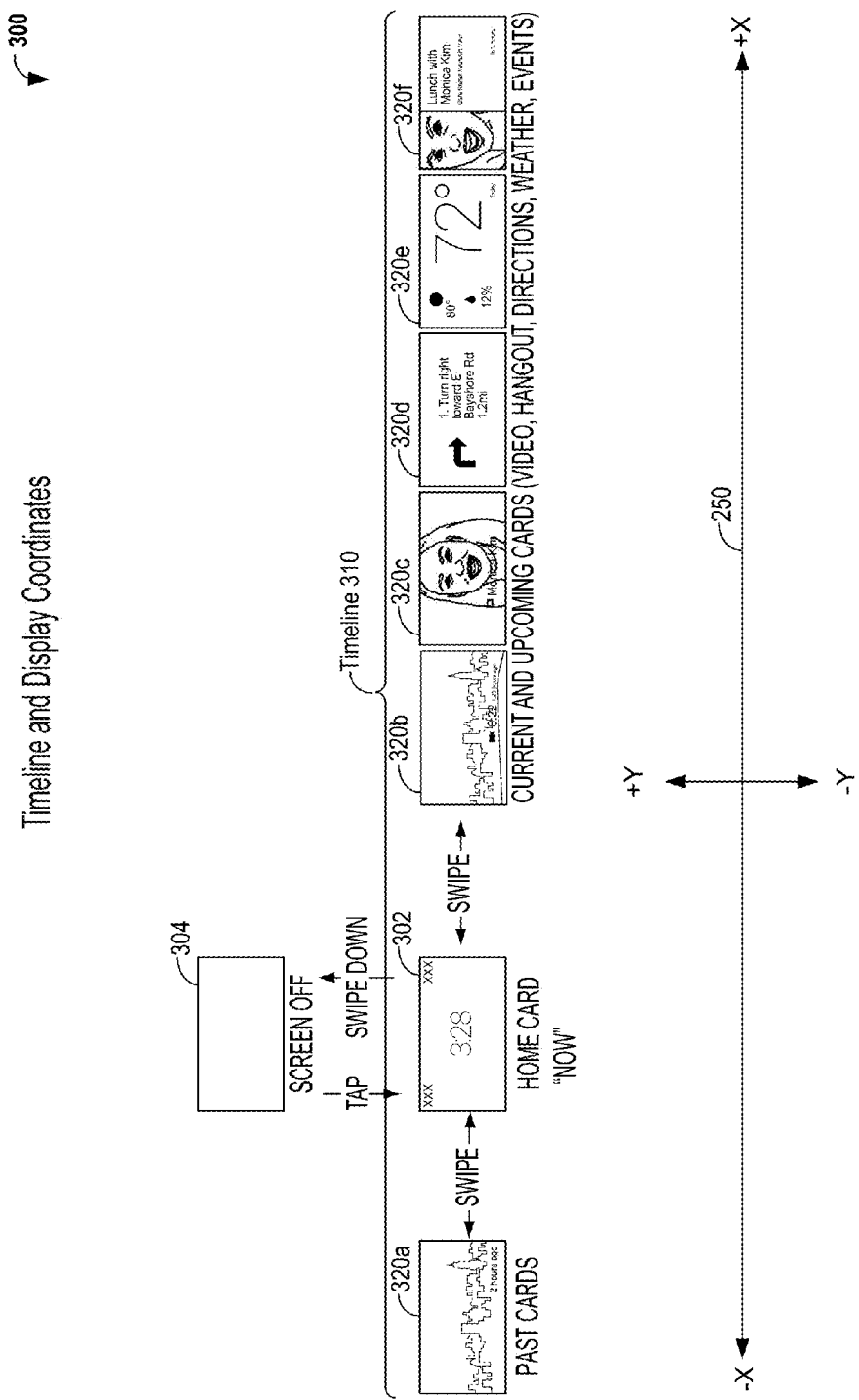
FIG. 3A shows a scenario of example timeline interactions, according to an example embodiment.

FIG. 3A shows a scenario 300 of example timeline interactions, according to an example embodiment. Scenario 300 begins with home card 302 being displayed by an HMD worn by a wearer. Home card 302 and cards 320*a*-320*c* can be arranged as a "timeline" or ordered sequence of cards. FIG. 3A shows that cards 320*a*-320*c* are arranged along the X-axis of device coordinate system 250. In the example shown in FIG. 3A, each card in timeline 310 has a specific time associated with the card.

Timeline 310 can be ordered along the X-axis based on the specific time associated with each card. In some cases, the specific time can be "now" or the current time. For example, home card 302 can be associated with the specific time of now. In other cases, the time can be a time associated with an event leading to the card. For example, FIG. 3A shows that card 320*a* represents a photo taken at a time 2 hours ago. Then, card 320*a* can be associated with the specific time of 1:28, which is 2 hours before the current time of 3:28 shown on home card 302. As the specific time of card 320*a* is less than now, the time associated with home card 302, card 320*a* is shown having a smaller X component in device coordinate system 250 than home card 302.

Cards 320*b*-320*f* represent current cards, or cards associated with the specific time of now, or upcoming cards, or cards associated with a future time. For example, card 320*b* is a current card that includes an image currently generated by a camera associated with the HMD, card 320*c* is a current card that includes an image of a "hangout" or video conference call currently in-progress generated by an application of the HMD, card 320*d* is a current card that includes an image and text currently generated by a navigation application/process presently running on the HMD, card 320*e* is a current card that includes images and text currently generated by a weather application of the HMD, and 320*f* is an upcoming card that includes images and text generated by a calendar application of the HMD indicating an appointment for "Lunch with Monica Kim" in "2 hours".

In some embodiments, home card 302 can be the left-most card along timeline 310 associated with the time of now; i.e., home card 302 can have the smallest X component for all cards associated with the time of now. Then, cards 320*b*-320*f*, each of which are associated with a time of now or a later time, can have a larger X component in device coordinate system 250 than home card 302.

In scenario 300, the HMD can enable navigation of time line 320 using swipe operations. For example, starting at home card 302, a swipe backward operation can cause the HMD to select and display a previous card, such as card 320*a*, and a swipe forward operation the HMD to select and display a next card, such as card 320*b*. Upon displaying card 320*b*, the swipe forward operation can cause the HMD to select and display the previous card, which is home card 302, and the swipe backward operation can cause the HMD to select and display the next card, which is card 320*c*.

In scenario 300, there are no cards in timeline 310 that are previous to card 320*a*. In one embodiment, the timeline is represented as circular. For example, in response to a swipe backward operation on card 320*a* requesting a previous card for display, the HMD can select 320*f* for (re)display, as there are no cards in timeline 310 that are after card 320*f* during scenario 300. Similarly, in response to a swipe forward operation on card 320*f* requesting a next card for display, the HMD can select 320*a* for (re)display, as there are no cards in timeline 310 that are after card 320*f* during scenario 300.

In another embodiment, instead of a circular representation of the timeline, when the user navigates to the end of the timeline, a notification is generated to indicate to the user that there are no additional cards to navigate to in the instructed direction. Examples of such notifications could include any of or a combination of any of a visual effect, an audible effect, a glowing effect on the edge of the card, a three dimensional animation twisting the edge of the card, a sound (e.g. a click), a textual or audible message indicating that the end of the timeline has been reached (e.g. "there are no cards older than this"). Alternatively, in one embodiment, an attempt by the user to navigate past a card in a direction where there are no additional cards could result in no effect, i.e. swiping right on card 320*a* results in no perceptible change to the display or card 320*a*.

Figure 3B:
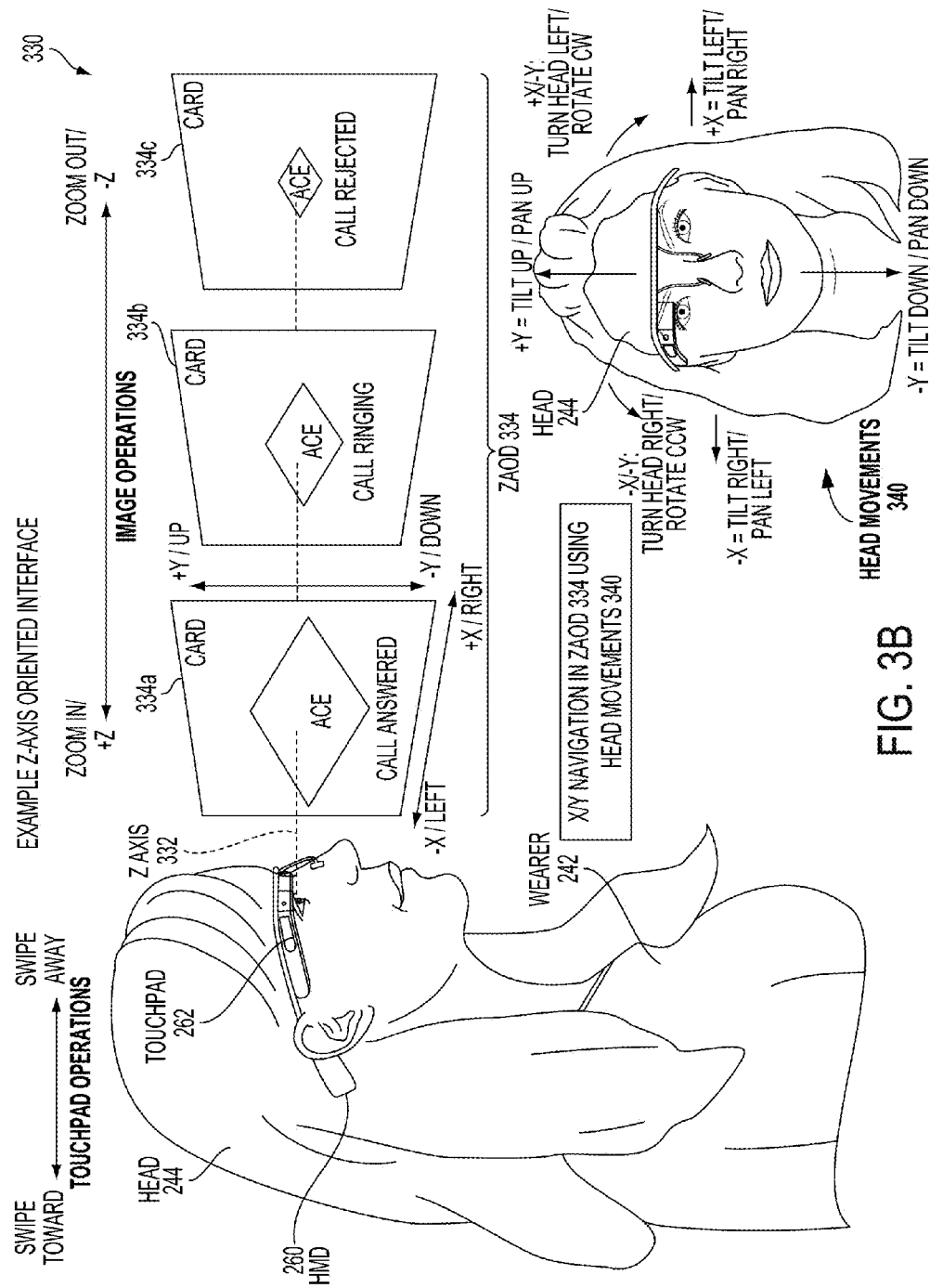
FIG. 3B shows an example scenario using a Z-axis oriented messaging interface, according to an example embodiment.

FIG. 3B shows scenario 330 using an example Z-axis oriented interface to answer an incoming telephone call, according to an example embodiment. Scenario 330 begins with wearer 242 wearing HMD 260 and viewing a card from a contact named "Ace" attempting to call wearer 242.

HMD 260 can then generate Z-Axis Oriented Display (ZAOD) 334 to permit wearer 242 to interact with the incoming call via graphical operations along Z axis 332. To simulate Z axis operations, increasing the size of an object in ZAOD 334 can simulate bringing the object closer (in the Z dimension), while decreasing the size of an object in ZAOD 334 can simulate moving away from the object (in the Z dimension).

ZAOD 334 can enable navigation within along an X axis, a Y-axis, and Z axis 332 shown in FIG. 3A. Navigation can include specification of X axis coordinate values, Y axis coordinate values, and Z axis coordinate values and displaying and/or updating ZAOD 334 as points within the volume are specified. Movements of head 244 of wearer 242 wearing HMD 260, such as head movements 340, can be used to navigate along the X and Y axes of ZAOD 334. For example, head movements 340 regarding Y-axis navigation can include a tilt up of head 244 of wearer 242 to increase the Y coordinate for ZAOD 334 and a tilt down of head 244 of wearer 242 to decrease the Y coordinate for ZAOD 334. Visually, increasing the Y coordinate appears as panning up in the display of card 336*a, b, c* in ZAOD 334 and decreasing the Y coordinate appears as panning down in the display of card 336*a, b, c* in ZAOD 334.

Regarding X-axis navigation of ZAOD 334, head movements 340 can include a tilt right of head 244 of wearer 242 (from wearer 242's point of view) to decrease the X coordinate for ZAOD 334 and a tilt left of head 244 of wearer 242 (from wearer 242's point of view) to increase the X coordinate for ZAOD 334. Visually, increasing the X coordinate appears as panning right in the display of card 336 *a, b, c* in ZAOD 334 and decreasing the X coordinate appears as panning left in the display of card 336 *a, b, c* in ZAOD 334.

In some scenarios, head movements 340 can include head motion(s) in both X and Y dimensions. For example turning or rotating head 244 of wearer 242 can generate a UI action related to rotation, such as rotating an image, card, or other display. FIG. 3B shows that turning head 244 down and to the right (from the point of view of wearer 242)—that is a head movement in both the −X and −Y directions—can lead to generation of a UI action related a counter-clockwise (CCW) rotation. FIG. 3B also shows that turning head 244 down and to the left (from the point of view of wearer 242)—that is a head movement in both the +X and −Y directions—can lead to generation of a UI action related a clockwise (CW) rotation.

Scenario 330 continues with HMD 260 displaying card 336*b* of ZAOD 334 with contact information, including an image of a grey diamond and a name Ace, for the calling party being displayed at an initial size. Card 336*b* indicates the call state by displaying the phrase "Call Ringing." In some embodiments, sounds such as a ring tone or other tones can be periodically and/or continuous played while ZAOD 334 is displayed. In other embodiments, a Z coordinate of a card displaying information in ZAOD 334 can be related to the size used by ZAOD 334 to display information; i.e., the Z coordinate of the card in ZAOD 334 can be proportional or otherwise related to the size used by ZAOD 334 to display information.

During scenario 330, wearer 242 first performs a swipe away operation using touchpad 262. In response to the swipe away operation, HMD 260 can decrease the size used by ZAOD 334 to display aspects of information, such as the contact information and/or call state indication displayed using ZAOD 334. If wearer 242 performs swipe away operation(s) with ZAOD 334 such that the Z coordinate (or related value) is less than a call-rejection threshold, then HMD 260 can be instructed to reject the incoming call. However, in scenario 330, wearer 242 decides to answer the call from Ace. As such, wearer 242 performs one or more swipe toward operations such that the Z coordinate (or related value) is greater than a call-acceptance threshold. Once the Z coordinate is greater than the call-acceptance threshold, card 336*a* of ZAOD 334 can be displayed, showing the contact information with a relatively-large contact information aspect and a call state indication of "Answered" to show that the call from Ace was answered.

Cropping Objects Using ZAODs

Figure 4:
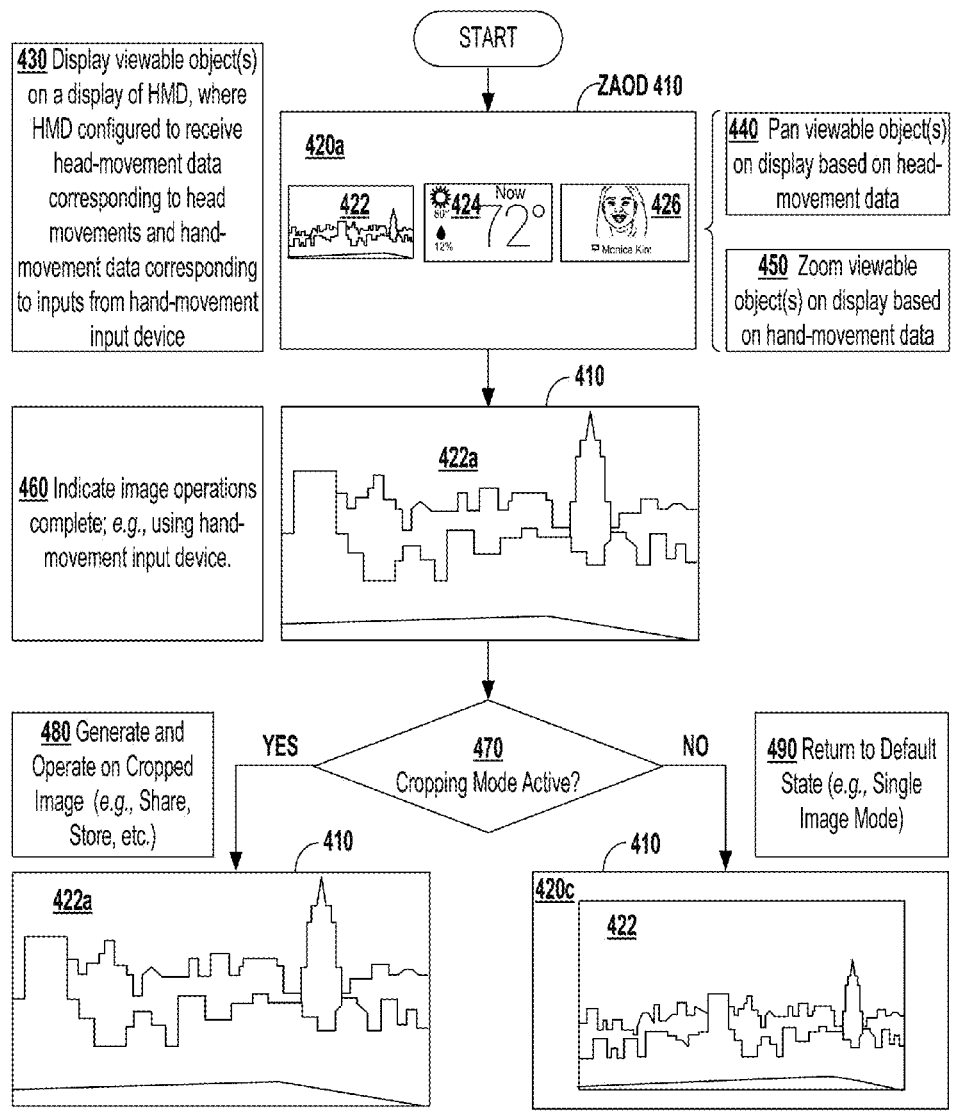
FIG. 4 shows an example method for cropping images using a Z-axis oriented display, according to an example embodiment.

FIG. 4 shows a method 400 for cropping viewable objects, such as images, using a ZAOD, such as ZAOD 410, displayed by an HMD, such as HMD 260. In the example shown in FIG. 4, the HMD initially displays display 420a, which shows a timeline display of three cards 422, 424, and 426, shown just to the right of block 430. In some embodiments, the timeline display can include one or more images, such as image 422.

Method 400 begins at block 430, where the HMD can display at least one wearable object on a display of the HMD. In some embodiments, the HMD can utilize a ZAOD, such as ZAOD 410, to display the at least one wearable object. The HMD can receive both head-movement data corresponding to head movements and hand-movement data corresponding to inputs from a hand-movement input device, such as discussed above regarding at least FIGS. 1A-3B and 5A-6B.

At block 440, the HMD can receive head-movement data. The HMD can pan the at least on viewable object on the display based on the head-movement data.

At block 450, the HMD can receive hand-movement data. The HMD can zoom the at least on viewable object on the display based on the hand-movement data.

In the example shown in FIG. 4, ZAOD 410 can display image 422a after receiving head-movement data to pan display 420a and after receiving hand-movement data to zoom display 420a. For example, the ZAOD can be configured to receive touchpad movements to change a Z-axis coordinate to zoom in and out and to receive head movements to change X- and Y-axis coordinates to move up, down, left, and right in the timeline, and to rotate displays, such as discussed above in the context of FIG. 3B. Once the X-axis, Y-axis, and/or Z-axis coordinates have been changed, the ZAOD can update the display based on the changed X-axis, Y-axis, and/or Z-axis coordinates. As such, ZAOD 410 can enable a wearer of the HMD to zoom in on a portion of image 422.

In some embodiments, the at least one viewable object can include an image. In other embodiments, the at least one viewable object can include a map. In particular embodiments, navigating within the ZAOD can include using the ZAOD to find a feature indicated on the map. In even other embodiments, the at least one viewable object can include a timeline display of one or more images.

In other embodiments, navigating within the ZAOD can include receiving an instruction to navigate within the ZAOD at the HMD, where the instruction is associated with a Z-component value Z for the ZAOD, determining a movement within the ZAOD in proportion to the Z-component value Z based on the instruction to navigate using the HMD, generating a moved ZAOD based on the movement within the ZAOD using the HMD, and displaying the moved ZAOD using the HMD. In particular embodiments, the instruction to navigate can include at least one instruction selected from the group consisting of an instruction to navigate along the X-axis, an instruction to navigate along the Y-axis, and an instruction to navigate along both the X-axis and the Y-axis. In certain embodiments, the instruction to navigate can include an instruction to navigate along an X-axis by X°, where the movement of the display can include a movement of $NP_x$ pixels, and where $NP_x = k_x X° Z$ with $k_x$ being a constant of proportionality for the X-axis, such as discussed below in the context of at least FIG. 7. In other certain embodiments, the instruction to navigate can include an instruction to navigate along a Y-axis by Y°, where the movement of the display includes a movement of $NP_y$ pixels, and where $NP_y = k_y Y° Z$, with $k_y$ being a constant of proportionality for the Y-axis, such as discussed below in the context of at least FIG. 7.

In the example shown in FIG. 4, the wearer concentrates on image 422 of a city. The wearer can use the hand movements and head movements to identify a "cropped image" or selected portion or entirety of image 422, such as example cropped image 422a of FIG. 4 shown just right of block 440.

The cropped image can be related to a cropping window of the image. For example, suppose image 422 has R rows and C columns of pixels. Using one-based addressing into the image, image 422 can be bounded by a rectangle from pixel (1, 1) in the upper-left-hand corner to pixel (R, C) in the lower-right-hand corner of image 422. Then, a cropping window can be used to specify a rectangular sub-image, that is, a cropped image, of image 422. The cropping window can have four parameters: $row_{min}$, $col_{min}$, $row_{max}$, and $col_{max}$ to specify the rectangular cropped image, where the upper-left-hand corner of the cropping window is ($row_{min}$, $col_{min}$), where the lower-right-hand corner of the cropping window ($row_{max}$, $col_{max}$), where $1 \leq row_{min}$, $row_{max} \leq R$, $1 \leq col_{min}$, $col_{max} \leq C$, $row_{min} \leq row_{max}$, and where $col_{min} \leq col_{min}$. Then, cropped image 422a is the rectangular sub-image of image 422a between upper-left-hand corner of the cropping window ($row_{min}$, $col_{min}$), and the lower-right-hand corner of the cropping window ($row_{max}$, $col_{max}$).

At block 440, the wearer can indicate to the HMD that navigation within the ZAOD is complete and so signal to the HMD that image 422a can be cropped, such as the example cropped image 422a. For example, the wearer can lift his/her fingers from a touchpad acting as a hand-movement input device to indicate navigation is complete. In some embodiments, the HMD can close ZAOD 410 after determining the wearer has lifted his/her fingers from the touchpad. In other embodiments, the HMD can store values, such as an image identifier for image 422 and the cropping window corresponding to cropped image 422a, for later use; e.g., to generate (or regenerate) cropped image 422a by applying the stored cropping window to identified image 422.

At block 460, after receiving an indication that navigation is complete, the HMD can determine whether a cropping mode is active. If the cropping mode is active, method 400 can proceed to block 470; otherwise, method 400 can proceed to block 480.

At block 470, the HMD can generate the cropped image that is based on a display of the ZAOD of the at least one viewable object when navigation within the ZAOD is complete, such as example cropped image 422a shown in FIG. 4 shown just below block 470. Then, the HMD can perform an operation on the cropped image.

Example operations on the cropped image include, but are not limited to, sharing the cropped image (e.g., via e-mail or other message), storing the cropped image, providing the cropped image to a social-networking site, uploading the cropped image (e.g., from the HMD to the Internet), and/or discarding the cropped image; e.g., closing the ZAOD without storing the cropped image In some embodiments, the display of the ZAOD of at least one viewable object when navigation within the ZAOD is complete can include a portion of an image, such as image 422a, and the portion of the image can be related to a cropping window for the image.

Method 400 can complete after block 470 has completed. In some embodiments, after block 470 has completed, method 400 can continue to block 480. In other embodiments, the cropping window associated with cropped image 422a can be used to crop a sequence of images; e.g., a sequence of images captured using a video camera.

At block 480, the HMD can return to a default state after ZAOD navigation is complete. For example, the HMD can use a single-image based UI to display a single image, such as example image 422 shown in FIG. 4 just below block 480. Method 400 can complete after block 480 has completed.

In some embodiments, method 400 can include that the ZAOD can be configured to display of a structured document, where the structured document can include a definition of a plurality of columns oriented on a Y-axis, and where navigating within the ZAOD includes navigating along one or more columns of the plurality of columns using the ZAOD, such as discussed below in the context of at least FIGS. 6A and 6B.

In other embodiments, method 400 can include that the ZAOD can be configured to display of a structured document, where the structured document can include a definition of a plurality of rows oriented on an X-axis, and where navigating within the ZAOD includes navigating along one or more rows of the plurality of rows using the ZAOD, such as discussed below in the context of at least FIGS. 6A and 6B.

Figure 5A:
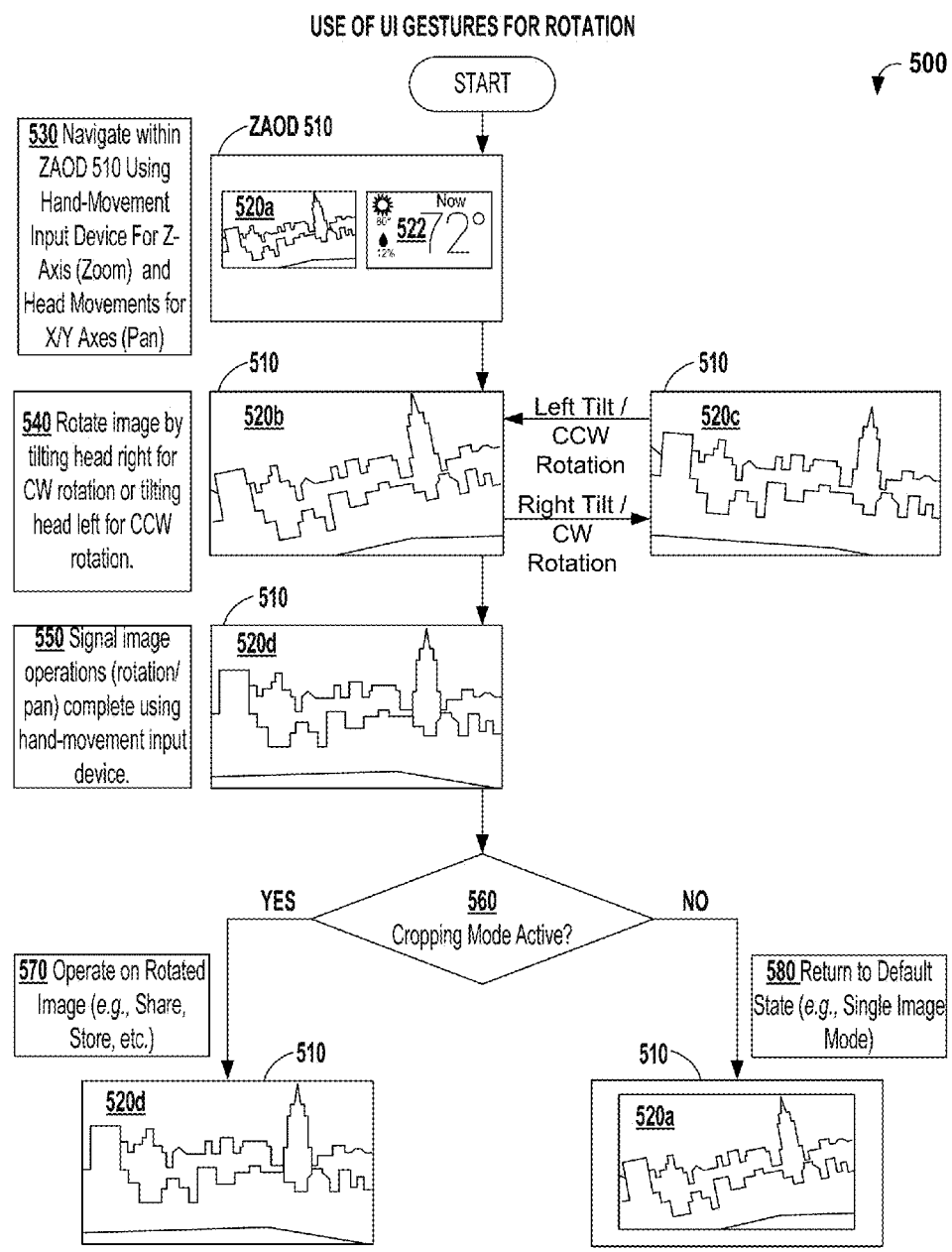
FIG. 5A shows another example method for cropping images using a Z-axis oriented display, according to an example embodiment.

FIG. 5A shows a method 500 for cropping images using a ZAOD, such as ZAOD 510, displayed by an HMD, such as HMD 260. In the example shown in FIG. 5A just to the right of block 530, ZAOD 510 initially displays a display 512 of a timeline having two cards 520a and 520b.

Method 500 begins at block 530, where ZAOD 510 can enable a wearer of the HMD to navigate in a display using hand movements detected by hand-movement input device(s) to change a Z-axis coordinate to zoom in and out and using head movements to change X- and Y-axis coordinates to move up, down, left, and right in the timeline, and to rotate displays, such as discussed above in the context of FIG. 3B.

In the example shown in FIG. 5A, the wearer concentrates on image 520a of a city. As shown in FIG. 5A, image 520a appears to be askew. The wearer can use hand movements and head movements to identify a cropped image for image 520a, such as example cropped image 520b of FIG. 5A shown just right of block 540. After zooming in to generate cropped image 520b, the wearer can determine that cropped image 520b is askew.

At block 540, the wearer can rotate cropped image 520b using head movements, such a tilting the wearer's head right for clockwise rotation of an image, such as an example image 520c shown in FIG. 5A, and/or tilting the wearer's head left for counter clockwise rotation of the image. In some embodiments, hand movements for zooming and head movements for panning and rotation can be performed in any order; e.g., the techniques of blocks 530 and 540 can be combined into one set of techniques and/or be performed in the opposite order than described above.

The cropping window discussed above in the context of FIG. 4 can be updated for rotated images. For example, suppose image 520a has R rows and C columns of pixels. Then, the cropping window can have five parameters: the four $row_{min}$, $col_{min}$, $row_{max}$, and $col_{max}$ parameters discussed above in the context of FIG. 4 that specify a rectangular cropped image, and a fifth parameter rot that specifies a rotation clockwise in degrees from the initial orientation of an image. The upper-left-hand corner of the cropping window can be ($row_{min}$, $col_{min}$), the lower-right-hand corner of the cropping window can be ($row_{max}$, $col_{max}$), where $1 \leq row_{min}$, $row_{max} \leq R$, $1 \leq col_{min}$, $col_{max} \leq C$, $row_{min} \leq row_{max}$, where $col_{min} \leq col_{max}$, and rot can be specified in degrees for a range such as $-360 \leq rot \leq +360$.

Then, cropped image 520d is the rectangular sub-image of image 520a rotated by rot degrees clockwise between upper-left-hand corner of the cropping window ($row_{min}$, $col_{min}$), and the lower-right-hand corner of the cropping window ($row_{max}$, $col_{max}$). In some embodiments, other measurements, such as radians, can be used to specify the rot parameter; while in other embodiments, the rot parameter can be specified in terms of other rotations (e.g., rotations counterclockwise), other measures (e.g., radian measures), and/or using a different range of values; e.g., $-180 \leq rot \leq +180$, $0 \leq rot \leq +360$. As another example, to specify only partial rotations of the image, the range $-p \leq rot \leq +p$ can be used, where $p < 180$.

At block 550, the wearer of the HMD can indicate navigation for image 520 is complete and so signal to the HMD that an image is cropped, such as example cropped image 520d of FIG. 5A. For example, the wearer can lift his/her fingers from a touchpad acting as a hand-movement input device to indicate image navigation is complete. In some embodiments, the HMD can close ZAOD 510 after determining the wearer has lifted his/her fingers from the touchpad. Also, the HMD can store values, such as an image identifier for image 520a and the cropping window corresponding to cropped image 520d, for later use; e.g., to quickly regenerate image 520d by applying the stored cropping window to identified image 520a.

At block 560, after receiving an indication that navigation is complete, the HMD can determine whether a cropping mode is active. If the cropping mode is active, method 500 can proceed to block 570; otherwise, method 500 can proceed to block 570.

At block 570, the HMD can operate on the cropped image, such as example cropped image 520d shown in FIG. 5A just below block 570. Example operations include, but are not limited to, sharing the cropped image, storing the cropped image can be shared, providing the cropped image to a social-networking site, uploading the cropped image (e.g., from the HMD to the Internet), and/or closing the cropped image without saving.

Method 500 can complete after block 570 has completed. In some embodiments, after block 570 has completed, method 500 can continue to block 580. In other embodiments, the cropping window associated with cropped image 520d can be projected onto or otherwise used to crop a sequence of images; e.g., a sequence of images captured using a video camera.

At block 580, the HMD can return to a default state after ZAOD navigation is complete. For example, the HMD can use a single-image based UI to display a single image, such as example image 520a as shown in FIG. 5A just below block 580. Method 500 can complete after block 580 has completed.

Figure 5B:
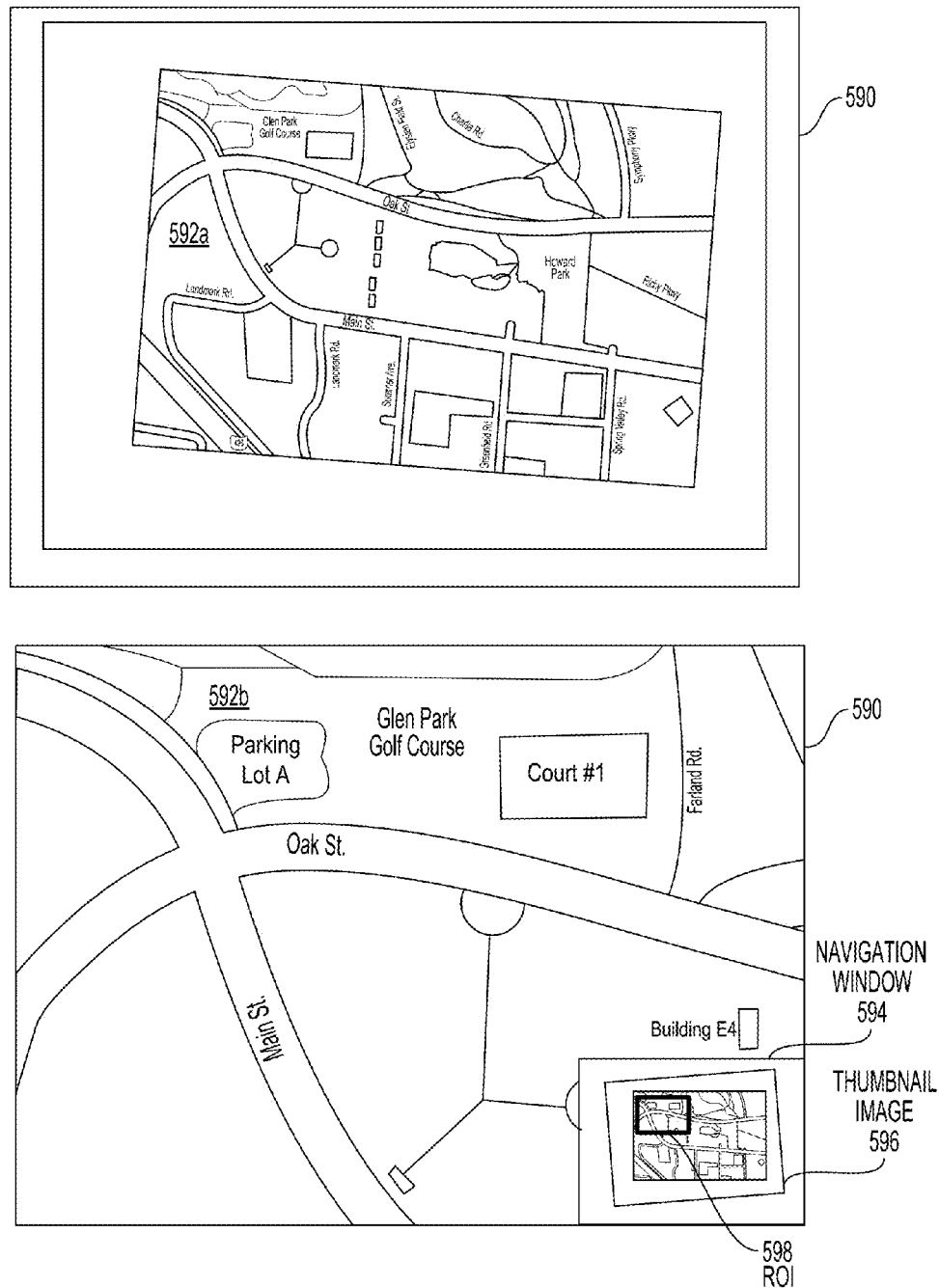
FIG. 5B shows a Z-axis oriented display, according to an example embodiment.

FIG. 5B shows an example ZAOD 590, according to an example embodiment. At the top of FIG. 5B, ZAOD 590 is shown initially displaying image 592a, which is an image of a map. ZAOD 590 can be displayed using an HMD, such as HMD 260, and worn by a wearer. For example, the wearer can be trying to find "Glen Park Golf Course" using the map shown in image 592a. ZAOD 590 can be used to zoom, pan, and rotate image 592a to generate image 592b.

As shown in FIG. 5B, image 592b has been zoomed to approximately three times the size of image 592a. To aid the wearer's ability to navigate within image 592*b*, ZAOD 590 can display a navigation window 594 that shows a smaller or thumbnail image 596 representing original image 592*a* and a region of interest (ROI) 598 within thumbnail image 596. ROI 598 can indicate a region within original image 592*a* that the wearer is navigating using ZAOD 590. In some embodiments, navigation window 594 can be displayed when ZAOD is navigating within a single image; while in other embodiments, navigation window 594 can be displayed or removed from display as requested by the wearer.

ZAOD Navigation within Structured Documents

In some scenarios, a ZAOD can be used to navigate within structured documents. A structured document is a displayable object that includes information about structure(s) within the object. For some objects, the information that the object is of a particular type can act as information about the structures within the document, such as the information that the object is a spreadsheet indicates the object likely has rows and columns, or a text document likely has one or more columns of text.

In addition, some objects can have additional structurally-related information. For example, a spreadsheet can include information about a number of rows and columns in the spreadsheet, row and column coordinates for values or cells within the spreadsheet, row and/or column headings, and additional information; e.g., maximum row and/or column coordinates for a cell that contains a specified value.

In some cases, the structurally-related information can be an integral part of the object. For example, a web page can include information, such as markup language instructions, style sheet instructions, and/or other information, that specifies structures within the web page.

A ZAOD can be used to readily navigate within such structured documents. For example, combinations of zoom and pan operations can be used to select a sub-sheet of a spreadsheet. Further, zoom and pan operations can be "locked" onto a structure of a structured document. For example, in navigating within a spreadsheet, panning operations can be restricted to a single row or specified group of rows when panning in the X dimension. While locked onto to the row(s), Y dimension movements can be ignored so that a wearer of an HMD displaying the ZAOD, such as HMD 260, can readily navigate across the row(s). Similarly, while panning in the Y dimension, movements can be restricted to one or more columns to permit ready navigation up and down the columns.

As another example, a web page can contain instructions that multiple columns of text, such as shown in a newspaper. Then, while the ZAOD is panning in the Y dimension, movements can be restricted to one column of text to permit reading of a story in that column. Further, the display can be restricted to only show the selected column to increase a size of text used to display the selected column.

A structure of the structured document can be locked on based on specific UI actions; e.g., a double tap followed by head movement in a given direction can be used to instruct the ZAOD to lock onto an X/Y axis structure associated with the given direction. For example, a double tap followed by a head motion to the left or right can instruct the ZAOD to lock onto row(s) of a structured document, and the number of rows to be displayed can be controlled using Z-axis navigation with the touchpad. Similarly, a double tap followed by a head motion up or down can instruct the ZAOD to lock onto column(s) of a structured document, and the number of columns to be displayed can be controlled using Z-axis navigation with the touchpad.

In other embodiments, the ZAOD can infer structures of the structured document to be locked on. For example, suppose the ZAOD initially displays a web page, and the wearer generally navigates using Y-axis oriented navigation commands to move up and down the page. The ZAOD can determine that the web page is structured into columns and infer that the wearer is reading a column of the web page based on navigation commands received after displaying the web page. For example, after displaying the web page, the ZAOD can infer column oriented navigation based on: a ratio of Y-axis oriented navigation commands to X-axis (and/or Z-axis) commands being above a threshold ratio, an average direction of head movement being within a threshold number of degrees (or other measure) of horizontal movement, a total number of Y-axis oriented navigation commands used to navigate the web page, and/or other measurements. Similar techniques can be used to determine row-oriented navigation and/or other directional navigation; e.g., a structured document displaying information diagonally.

Figure 6A:
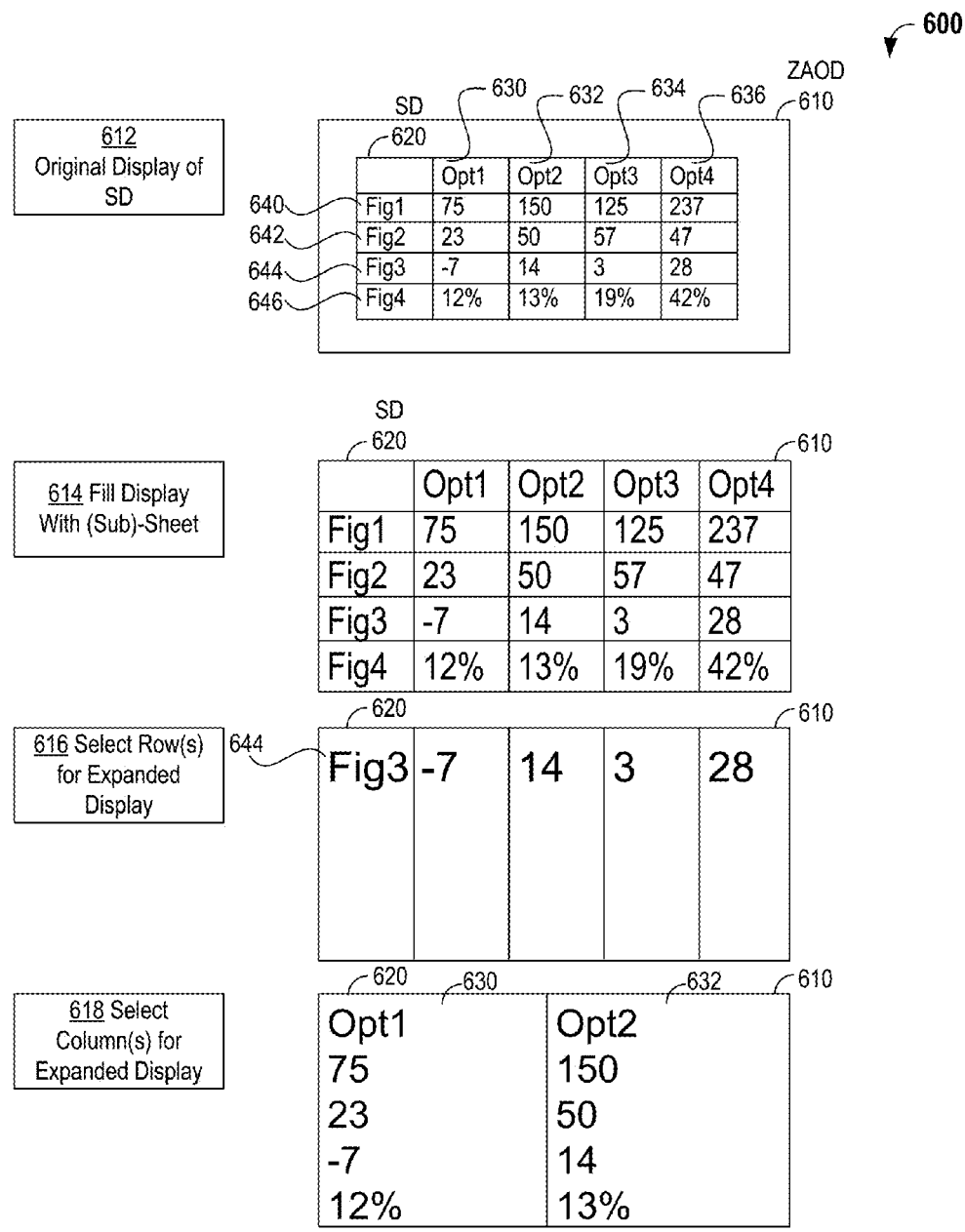
FIG. 6A shows a scenario 600 of navigation within a structured document 620 using ZAOD 610, according to an example embodiment.

FIG. 6A shows a scenario 600 of navigation within structured document (SD) 620 using ZAOD 610, according to an example embodiment. Scenario 600 starts at block 612 with an HMD, such as HMD 260 using ZAOD 610 to generate a display of structured document 620. FIG. 6A shows that structured document 620 includes a spreadsheet with columns 630, 632, 634, 636 and rows 640, 642, 644, 646.

Scenario 600 continues at block 614 with a wearer of the HMD performing a fill-display UI operation, such as a double-tap, to instruct the HMD to fill a display with a visible portion of the spreadsheet of structured document 620. In response, the HMD can expand the visible portion of structured document to use an entirety of visible space provided by ZAOD 610.

At block 616, scenario 600 continues with the wearer performing a row-selection UI operation, such as a quick horizontal head motion, to select one or more rows for display. In response, the HMD can display one or more rows using the entirety of visible space provided by ZAOD 610. FIG. 6A shows an example where the HMD displays one row, row 644, of structured document 620 using the entirety of visible space provided by ZAOD 610. In some embodiments, the wearer can use the touchpad of the HMD to instruct ZAOD 610 to zoom in on one or more rows, such as row 644 shown in FIG. 6A, and then perform the row-selection UI operation to instruct the HMD to fill the display with the contents of the selected row(s).

In other embodiments, the HMD can recognize that ZAOD 610 is displaying a selected number of row(s) from a structured document, and "lock on" to X-axis oriented head movements. That is, the HMD can generally or completely ignore Y-axis, or up and down, oriented head movements while displaying the selected rows of structured document 620. The HMD can lock on to X-axis oriented head movements until the HMD is instructed not to select row(s) for display; e.g., by either exiting display of structured document 620 or by returning to a default view of structured document 620.

Scenario 600 continues at block 618 with the wearer performing a column-selection UI operation, such as a quick vertical head motion, to select one or more columns for display. In response, the HMD can display one or more columns using the entirety of visible space provided by ZAOD 610. FIG. 6A shows an example where the HMD displays two columns, columns 630 and 632, of structured document 620 using the entirety of visible space provided by ZAOD 610.

In some embodiments, the wearer can use the touchpad of the HMD to instruct ZAOD 610 to zoom in on one or more columns, such as columns 630 and 632 shown in FIG. 6A, and then perform the column-selection UI operation to instruct the HMD to fill the display with the contents of the selected column(s). In other embodiments, the HMD can recognize that ZAOD 610 is displaying a selected number of column(s) from a structured document, and lock on to Y-axis oriented head movements. That is, the HMD can generally or completely ignore X-axis, or left and right, oriented head movements while displaying the selected columns of structured document 620. The HMD can lock on to Y-axis oriented head movements until the HMD is instructed not to select column(s) for display; e.g., by either exiting display of structured document 620 or by returning to a default view of structured document 620. After selecting columns for expanded display, scenario 600 can end.

Figure 6B:
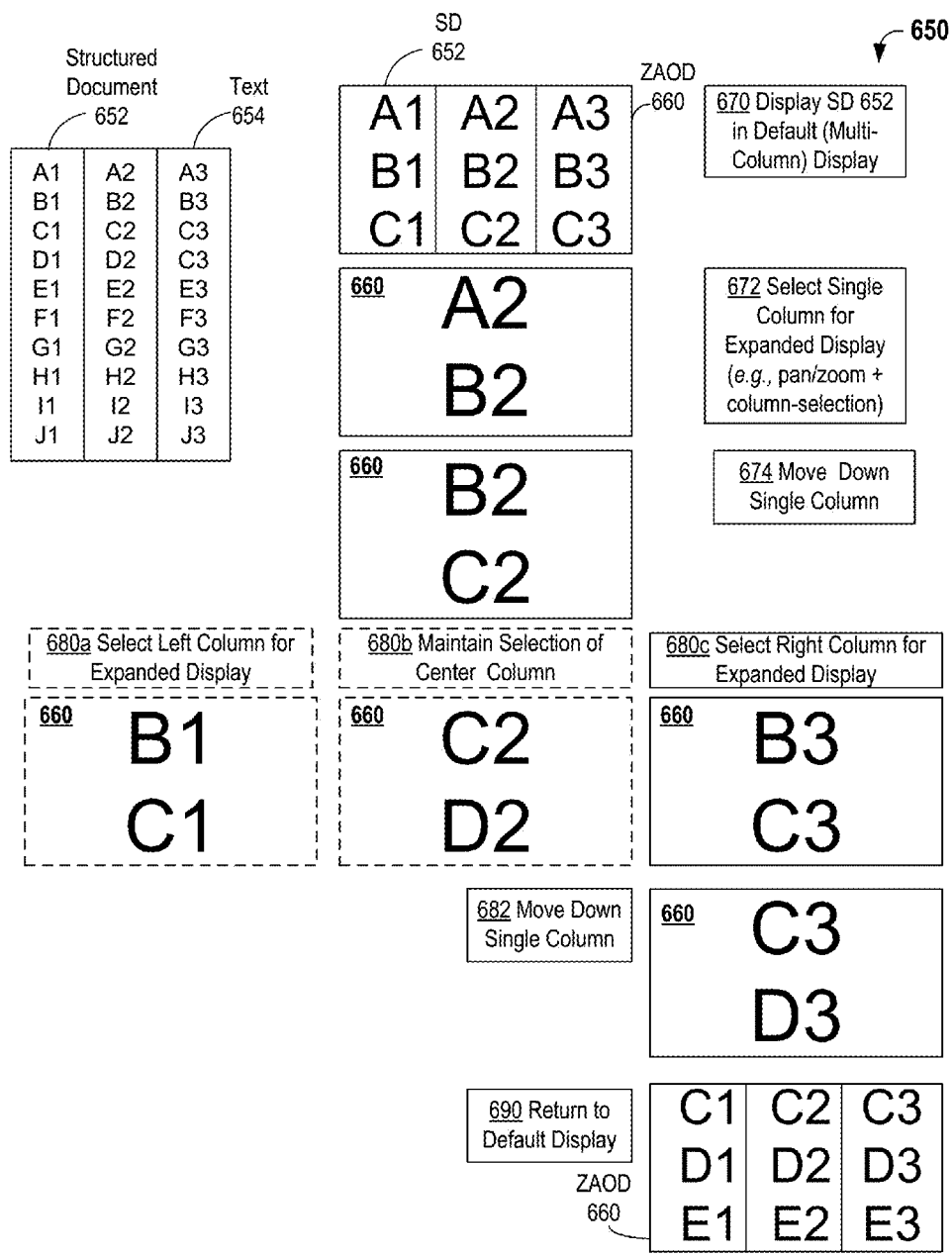
FIG. 6B shows a scenario 650 of navigation within structured documents 652 using ZAOD 610, according to an example embodiment.

FIG. 6B shows a scenario 650 of navigation within structured document 652 with columnar formatting of text (e.g., a document representing a newspaper or multi-column formatted paper) using ZAOD 610, according to an example embodiment. Structured document 652 is shown in an upper-left-hand-corner of FIG. 6B having text 654 in three columns of nine rows each: a left column of text with words "A1", "B1" ... "J1", a center column of text with words "A2", "B2" ... "J2", and a right column with words "A3", "B3" ... "J3".

Scenario 650 begins at block 670 where ZAOD 660 displays structured document 652 with a default multi-column display. As shown in FIG. 6B, a default display of structured document 652 can include a portion of each of the three columns of structured document 652.

At block 672 of scenario 650, a wearer of the HMD can perform a column-selection UI operation to select one or more columns for display. In response, the HMD can display one or more columns using the entirety of visible space provided by ZAOD 660. FIG. 6B shows an example where the HMD displays only the center column of structured document 652 using the entirety of visible space provided by ZAOD 660. In some embodiments, the wearer can use the touchpad of the HMD to instruct ZAOD 660 to zoom in on the center column of structured document 652 as shown in FIG. 6B, and then perform the column-selection UI operation to instruct the HMD to fill the display with the contents of the selected column.

At block 674, the wearer can use a pan-down head movement of head movements 340 to move down the center column of structured document 652. FIG. 6B shows that, at block 674 after moving down, the top row of text in the center column "A2" is no longer displayed, and the third row of text "C2" is now displayed by ZAOD 660. In some embodiments, the HMD can recognize that ZAOD 660 is displaying a single column of text from a structured document, and lock on to Y-oriented head movements during the single column display.

Scenario 650 continues at block 680c where the right column of structured document 652 is selected for display; e.g., by the wearer performing a column-selection UI operation to select the right column of structured document 652. As other examples that are not part of scenario 650, FIG. 6B shows block 680a where the wearer performs a column-selection UI operation to select the left column of structured document 652, and block 680b, where the wearer can use a pan-down head movement to continue to go down the center column of structured document 652.

At block 682 of scenario 650, the wearer can use a pan-down head movement of head movements 340 to move down the right column of structured document 652. FIG. 6B shows that, at block 682 after moving down, the second row of text in the right column "B3" is no longer displayed, and the fourth row of text "D3" is now displayed by ZAOD 660. In some embodiments, the HMD can recognize that ZAOD 660 is displaying a single column of text from a structured document, and lock on to Y-oriented head movements during the single column display.

Scenario 650 can continue at block 690, where the wearer can use a UI operation, such as lifting their fingers from the touchpad of the HMD, to return to a default display of structured document 652. FIG. 6B shows the default display being performed by ZAOD 660. In other embodiments, the default display can be performed by a single image and/or X-Y oriented user interface to the HMD. After displaying the default display of structured document 652, scenario 650 can end.

Z-Dimensional Proportional Navigation for ZAODs

FIG. 7 shows a number of images from an HMD, such as HMD 260, utilizing a ZAOD, such as ZAOD 710, for Z-dimensional proportional navigation, according to an example embodiment. ZAOD 710 can be configured to operate using X-axis, Y-axis and Z-axis components. For example, ZAOD 210 can operate at an initial Z-axis component of z and an initial X/Y-axis position of "centered"; i.e., centered on both the X and Y axis; e.g., at the (X, Y, Z) coordinate of (0, 0, 1). For example, ZAOD 710 having Z-axis component z and an X/Y-axis position of "centered" can generate display 730 at the center of FIG. 7. Display 730 includes three images of a timeline. In the example shown in FIG. 7, the entirety of the timeline depicted in part in display 730 is shown in display 720 (just above display 730) with images 720a, 720b, 720c, 720d, and 720e.

The top row of FIG. 7 shows displays 720, 722, 724 utilizing ZAOD 710 at a Z-axis component of approximately 1.66z, the middle row of FIG. 7 shows displays 730, 732, 734 at a Z-axis component of z, and the bottom row of FIG. 7 shows displays 740, 742, 744 at a Z-axis component of approximately 0.25z. For example, ZAOD 710 can use touchpad movements for Z axis navigation; in this example, the center row displays 730, 732, 734 can be displayed while the wearer of the HMD has not zoomed a display either in or out, the top row displays 720, 722, 724 can be displayed after the wearer has used to the touchpad to zoom out the display, and the bottom row displays 740, 742, 744 can be displayed after the wearer has used to the touchpad to zoom in the display.

The center column of FIG. 7 shows displays 720, 730, 740 utilizing ZAOD 710 without any navigational movement, the left column shows displays 722, 732, 742 utilizing ZAOD 710 after a left navigational movement of X°, and the right column shows displays 722, 732, 742 utilizing ZAOD 710 after a right navigational movement of X°. For example, ZAOD 710 can use head movements for X and Y axis navigation; in this example, the center column displays 720, 730, 740 can be displayed while the wearer of the HMD is looking straight ahead, the left column displays 722, 732, 742 can be displayed while the wearer of the HMD is looking left by X°, and the right column displays 724, 734, 744 can be displayed while the wearer of the HMD is looking right by X°.

To generate displays 720-744, ZAOD 710 can move a display after X/Y axis movements by a number of pixels that are in proportion to the Z-axis component. For example, a X-axis movement of X° can act as an instruction to ZAOD 710 to move a display by a number of pixels $NP_x$ along the X-axis based on the X-axis movement such that $NP_x \propto Z$. For example, $NP_x = k_x \, X° \, Z$, where $k_x$ is a constant of proportionality for the X-axis, X° indicates an X-axis movement in degrees, and Z is a current Z-axis component for ZAOD 710. In some embodiments, X-axis components can be signed, such as according to a device coordinate system where positive X and negative X-axis components respectively correspond to right and left movements, positive Y and negative Y-axis components respectively correspond to up and down movements, and positive Z and negative Z-axis components values respectively correspond to movements closer and farther away.

While not shown in FIG. 7, similar techniques can be moving move a display after Y axis movements by a number of pixels that are in proportion to the Z-axis component. For example, a Y-axis movement of Y° can act as an instruction to ZAOD 710 to move a display by a number of pixels $NP_y$ along the Y-axis based on the Y-axis movement such that $NP_y \propto Z$. For example, $NP_y = k_y \, Y° \, Z$, where $k_y$ is a constant of proportionality for the Y-axis, Y° indicates a Y-axis movement in degrees, and Z is a current Z-axis component for ZAOD 710. In still other embodiments, X-axis and Y-axis movements can be specified in terms other than degrees, such as but not limited to changes in X or Y coordinate values or percentage changes in X or Y coordinates.

F. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
    displaying at least one viewable object on a display provided by a head-mountable device (HMD) configured with a hand-movement input device, wherein the HMD is configured to receive head-movement data corresponding to head movements and to receive hand-movement data corresponding to inputs from the hand-movement input device;
    receiving head-movement data at the HMD;
    panning the at least one viewable object on the display based on the head-movement data;
    receiving hand-movement data at the HMD;
    zooming the at least one viewable object on the display based on the hand-movement data;
    receiving, at the HMD, an indication that navigation of the at least one viewable object is complete, wherein the navigation of the at least one viewable object includes panning the at least one viewable object on the display based on the head-movement data, and zooming the at least one viewable object on the display based on the hand-movement data;

determining whether a cropping mode is activated using the HMD; and responsive to determining that the cropping mode is activated, the HMD generating a cropped image of the at least one viewable object on the display resulting from the navigation of the at least one viewable object being complete.

2. The method of claim 1, wherein the at least one viewable object comprises an image, and wherein the display when navigation of the at least one viewable object is complete comprises a portion of the image, and wherein the portion of the image is related to a cropping window for the image.

3. The method of claim 1, wherein the at least one viewable object comprises a map, and wherein zooming the at least one viewable object on the display comprises zooming the map on the display to find a feature indicated on the map.

4. The method of claim 1, wherein the display provided by the HMD is shown in a display plane, and wherein the hand-movement input device is disposed on the HMD and comprises a touchpad configured to be substantially perpendicular to the display plane.

5. The method of claim 1, further comprising performing an operation on the cropped image, wherein the operation on the cropped image includes at least one of sharing the cropped image, storing the cropped image, or uploading the cropped image.

6. The method of claim 1, wherein the at least one viewable object comprises a timeline display of one or more images.

7. The method of claim 1, wherein zooming the at least one viewable object on the display comprises:

determining a movement regarding a Z-axis within a Z-axis oriented display (ZAOD) based on the hand-movement data;

generating a moved ZAOD based on the movement regarding the Z-axis; and displaying the moved ZAOD using the HMD.

8. The method of claim 1, wherein panning the at least one viewable object on the display comprises determining a movement based on the head-movement data within a Z-axis oriented display (ZAOD) regarding an X-axis, determining a movement based on the head-movement data within the ZAOD regarding a Y-axis, or determining a movement based on the head-movement data within the ZAOD regarding both the X-axis and the Y-axis.

9. The method of claim 8, wherein the movement based on the head-movement data within the ZAOD regarding the X-axis corresponds to a movement of $NP_x$ pixels within the ZAOD of X° along the X-axis, and wherein $NP_x = k_x$ X° Z, with $k_x$ being a constant of proportionality for the X-axis, and Z being a Z-axis coordinate value.

10. The method of claim 8, wherein the movement based on the head-movement data within the ZAOD regarding the Y-axis corresponds to a movement of $NP_y$ pixels within the ZAOD of Y° along the Y-axis, and wherein $NP_y = k_y$ Y° Z, with $k_y$ being a constant of proportionality for the Y-axis, and Z being a Z-axis coordinate value.

11. The method of claim 1, wherein the at least one viewable object comprises a structured document, wherein the structured document can include a definition of a plurality of columns, and wherein panning the at least one viewable object on the display comprises panning along one or more columns of the plurality of columns.

12. An apparatus, including a non-transitory computer-readable storage medium having stored thereon program instructions that, upon execution by a computing device, cause the apparatus to perform functions comprising:

displaying at least one viewable object on a display, wherein the apparatus is configured to receive head-movement data corresponding to head movements and to receive hand-movement data corresponding to inputs from a hand-movement input device;

panning the at least one viewable object on the display based on received head-movement data;

zooming the at least one viewable object on the display based on received hand-movement data;

receiving an indication that navigation of the at least one viewable object is complete, wherein the navigation of the at least one viewable object includes panning the at least one viewable object on the display based on the head-movement data, and zooming the at least one viewable object on the display based on the hand-movement data;

determining whether a cropping mode is activated; and responsive to determining that the cropping mode is activated, generating a cropped image of the at least one viewable object on the display resulting from the navigation of the at least one viewable object being complete.

13. The apparatus of claim 12, wherein the at least one viewable object comprises an image, wherein the display when navigation of the at least one viewable object is complete comprises a portion of the image, and wherein the portion of the image is related to a cropping window for the image.

14. The apparatus of claim 12, wherein the functions further comprise performing an operation on the cropped image, wherein the operation on the cropped image includes at least one sharing the cropped image, storing the cropped image, or uploading the cropped image.

15. The apparatus of claim 12, wherein zooming the at least one viewable object on the display comprises:

determining a movement regarding a Z-axis within a Z-axis oriented display (ZAOD) based on the hand-movement data;

generating a moved ZAOD based on the movement within the ZAOD; and displaying the moved ZAOD.

16. The apparatus of claim 15, wherein panning the at least one viewable object on the display comprises determining a movement based on the head-movement data within a Z-axis oriented display (ZAOD) regarding an X-axis, determining a movement based on the head-movement data within the ZAOD regarding a Y-axis, or determining a movement based on the head-movement data within the ZAOD regarding both the X-axis and Y-axis.

17. The apparatus of claim 16, wherein the movement based on the head-movement data within the ZAOD regarding the X-axis corresponds to a movement of $NP_x$ pixels within the ZAOD of X° along the X-axis, and wherein $NP_x = k_x$ X° Z, with $k_x$ being a constant of proportionality for the X-axis, and Z being a Z-axis coordinate value.

18. The apparatus of claim 16, wherein the movement based on the head-movement data within the ZAOD regarding the Y-axis corresponds to a movement of $NP_y$ pixels within the ZAOD of Y° along the Y-axis, and wherein $NP_x = k_y$ Y° Z, with $k_y$ being a constant of proportionality for the Y-axis, and Z being a Z-axis coordinate value.

19. A computing device, comprising:
a hand-movement input device;
a display;
a processor; and
a non-transitory computer-readable storage medium having stored thereon program instructions that, upon execution by the processor, cause the computing device to perform operations comprising:
  displaying at least one viewable object on the display, wherein the computing device is configured to receive head-movement data corresponding to head movements and to receive hand-movement data corresponding to inputs from the hand-movement input device;
  receiving head-movement data;
  panning the at least one viewable object on the display based on the head-movement data;
  receiving hand-movement data;
  zooming the at least one viewable object on the display based on the hand-movement data;
  receiving an indication that navigation of the at least one viewable object is complete, wherein the navigation of the at least one viewable object includes panning the at least one viewable object on the display based on the head-movement data, and zooming the at least one viewable object on the display based on the hand-movement data;
  determining whether a cropping mode is activated; and
  responsive to determining that the cropping mode is activated, generating a cropped image of the at least one viewable object on the display resulting from the navigation of the at least one viewable object being complete.

20. The computing device of claim 19, further comprising:
  one or more sensors configured to generate the head-movement data; and
  a frame configured to be worn as a head-mountable device, wherein at least the hand-movement input device, the display, and the one or more sensors are coupled to the frame,
    wherein the display defines a display plane,
    and wherein the hand-movement input device is a touchpad that is configured to be substantially perpendicular to the display plane.

* * * * *